United States Patent [19]
Goodpaster

[11] Patent Number: 6,058,353
[45] Date of Patent: May 2, 2000

[54] SYSTEM AND METHOD FOR PROVIDING BACKUP PROTECTION FOR CIRCUIT BREAKER FAILURE

[75] Inventor: Barry G. Goodpaster, Westmont, Ill.

[73] Assignee: Commonwealth Edison Company, Chicago, Ill.

[21] Appl. No.: 08/788,900

[22] Filed: Jan. 23, 1997

[51] Int. Cl.7 ............................ G05B 9/02; G05B 19/048; H02H 7/22

[52] U.S. Cl. ................................ 702/58; 307/18; 307/24; 307/31; 702/85; 702/64

[58] Field of Search ................................ 361/62, 63, 64, 361/66, 69, 71, 78, 79, 80, 81; 702/58, 85, 64; 307/18, 24, 31

[56] References Cited

U.S. PATENT DOCUMENTS

| | | |
|---|---|---|
| 3,144,585 | 8/1964 | Blakemore . |
| 3,602,776 | 8/1971 | Gonnam ..................................... 361/75 |
| 3,611,043 | 10/1971 | Steen ........................................ 361/102 |
| 3,777,215 | 12/1973 | D'Esopo .................................... 361/94 |
| 4,161,027 | 7/1979 | Russell ...................................... 364/492 |
| 4,419,619 | 12/1983 | Jindrick et al. ........................... 323/257 |
| 4,686,630 | 8/1987 | Marsland et al. .................. 364/528.21 |
| 4,785,405 | 11/1988 | Hasegawa et al. ................. 364/528.32 |
| 4,845,594 | 7/1989 | Wilkerson ................................. 361/71 |
| 5,041,737 | 8/1991 | Schweitzer, III et al. .............. 307/125 |
| 5,157,575 | 10/1992 | Feltis et al. ................................ 361/63 |
| 5,170,310 | 12/1992 | Studtmann et al. ....................... 361/94 |
| 5,179,376 | 1/1993 | Pomatto ............................ 340/870.02 |
| 5,293,295 | 3/1994 | Nishitani ................................... 361/63 |
| 5,295,035 | 3/1994 | Nishijima et al. ........................ 361/63 |
| 5,341,268 | 8/1994 | Ishiguro et al. ........................... 361/62 |
| 5,406,495 | 4/1995 | Hill .......................................... 702/72 |
| 5,422,561 | 6/1995 | Williams et al. ........................ 323/209 |
| 5,428,553 | 6/1995 | Chiba et al. ........................ 364/528.28 |
| 5,455,776 | 10/1995 | Novosel ..................................... 702/59 |
| 5,513,061 | 4/1996 | Gelbien et al. ............................ 361/63 |
| 5,517,423 | 5/1996 | Pomatto ............................. 364/528.21 |
| 5,528,507 | 6/1996 | McNamara et al. ............... 364/528.21 |
| 5,539,653 | 7/1996 | Pomatto ............................... 364/528.3 |
| 5,550,751 | 8/1996 | Russell ............................... 364/528.28 |
| 5,568,399 | 10/1996 | Sumic ................................. 364/528.28 |

OTHER PUBLICATIONS

U.S. Ser. No. 08/787,607 entitled "System and Method for Providing Integrated Reclosing of Circuit Breakers in a Power Substation," filed Jan. 23, 1997 and assigned to present assignee.

U.S. Ser. No. 08/788,046 entitled "System and Method for Providing Backup Protection for Feeder Relay Failure," filed Jan. 23, 1997 and assigned to present assignee.

Diehl, G. et al., "Simplified Control System Provides Ease in Troubleshooting," *Transmission & Distribution*, pp. 1–4, Aug. 1993.

Olson, Todd, PLCs Lead the Way to Substation Standardization Automation, "Electric World," (Apr., 1998), pp. 2–5.

*Primary Examiner*—Jim Trammell
*Assistant Examiner*—Cuong H. Nguyen
*Attorney, Agent, or Firm*—Brinks Hofer Gilson & Lione

[57] ABSTRACT

The present invention provides backup protection for circuit breaker failure by providing a programmable controller coupled to detect the failure of a circuit breaker to open on command and generate a command signal to all circuit breakers coupled to the programmable controller to open.

13 Claims, 27 Drawing Sheets

Microfiche Appendix Included
(2 Microfiche, 149 Pages)

FIG. 2a

| # | Contact | Coil | INPUT DESCRIPTION |
|---|---|---|---|
| 1 | BT 1-2 52b MOC | 1-2CB | 12.5 KV BT 1-2 MECHANISM OPERATED CONTACT-CLOSED WHEN CB IS OPEN |
| 2 | BT 1-2 52b TOC | 1-2CBRO | 12.5 KV BT 1-2 TRUCK OPERATED CONTACT-CLOSED WHEN CB IS RACKED OUT. |
| 3 | BT 1-4 52b MOC | 1-4CB | 12.5 KV BT 1-4 CLOSED WHEN CB IS OPEN. |
| 4 | BT 1-4 52b TOC | 1-4CBRO | 12.5 KV BT 1-4 CLOSED WHEN CB IS RACKED OUT. |
| 5 | FDR 1 52b MOC | F1CB | 12.5 KV BUS 1 FDR 1-CLOSED WHEN CB IS OPEN. |
| 6 | FDR 1 52b TOC | F1CBRO | 12.5 KV BUS 1 FDR 1-CLOSED WHEN CB IS RACKED OUT. |
| 7 | FDR 2 52b MOC | F2CB | 12.5 KV BUS 1 FDR 2-CLOSED WHEN CB IS OPEN. |
| 8 | FDR 2 52b TOC | F2CBRO | 12.5 KV BUS 1 FDR 2-CLOSED WHEN CB IS RACKED OUT. |
| 9 | FDR 3 52b MOC | F3CB | 12.5 KV BUS 1 FDR 3-CLOSED WHEN CB IS OPEN. |
| 10 | FDR 3 52b TOC | F3CBRO | 12.5 KV BUS 1 FDR 3-CLOSED WHEN CB IS RACKED OUT. |
| 11 | FDR 4 52b MOC | F4CB | 12.5 KV BUS 1 FDR 4-CLOSED WHEN CB IS OPEN |
| 12 | FDR 4 52b TOC | F4CBRO | 12.5 KV BUS 1 FDR 4-CLOSED WHEN CB IS RACKED OUT. |
| 13 | FDR 1 TRIP | F1TRIP | FDR 1 RELAY TRIP. SEL 251 "A1" CONTACT AND DFM "OUTPUT 2" CONTACTS IN PARALLEL |
| 14 | FDR 1 RELAY FAILURE | F1FAIL | FDR 1 DFM AND SEL 251 FAILURE CONTACTS WIRED IN SERIES. |
| 15 | FDR 2 TRIP | F2TRIP | FDR 2 RELAY TRIP. SEL 251 "A1" CONTACT AND DFM "OUTPUT 2" CONTACTS IN PARALLEL |
| 16 | FDR 2 RELAY FAILURE | F2FAIL | FDR 2 DFM AND SEL 251 FAILURE CONTACTS WIRED IN SERIES. |
| 17 | FDR 3 TRIP | F3TRIP | FDR 3 RELAY TRIP. SEL 251 "A1" CONTACT AND DFM "OUTPUT 2" CONTACTS IN PARALLEL |
| 18 | FDR 3 RELAY FAILURE | F3FAIL | FDR 3 DFM AND SEL 251 FAILURE CONTACTS WIRED IN SERIES. |
| 19 | FDR 4 TRIP | F4TRIP | FDR 4 RELAY TRIP. SEL 251 "A1" CONTACT AND DFM "OUTPUT 2" CONTACTS IN PARALLEL |
| 20 | FDR 4 RELAY FAILURE | F4FAIL | FDR 4 DFM AND SEL 251 FAILURE CONTACTS WIRED IN SERIES. |
| 21 | SEL 251C TRIP | SEL251C | BUS 1 BUS BACK-UP SEL 251C TRIP. |
| 22 | 87 B1 TRIP | 87B1 | BUS 1 BUS DIFFERENTIAL |
| 23 | BT 1-2 CB TRIP | 1-2TR | 12.5 KV BT 1-2 TRIP BUS |
| 24 | BT 1-4 CB TRIP | 1-4TR | 12.5 KV BT 1-4 TRIP BUS |
| 25 | FDR 1 CURRENT | F1OC | FDR 1 SEL 251 "A3" CONTACT |
| 26 | FDR 2 CURRENT | F2OC | FDR 2 SEL 251 "A3" CONTACT |
| 27 | FDR 3 CURRENT | F3OC | FDR 3 SEL 251 "A3" CONTACT |
| 28 | FDR 4 CURRENT | F4OC | FDR 4 SEL 251 "A3" CONTACT |
| 29 | | | |
| 30 | | | |
| 31 | | | |
| 32 | | | |

\* - THESE POINTS INITIATE AN OUTPUT
\*\* - VIRTUAL POINTS CONTROLLED BY SYSTEM INTEGRATOR
ODT=ON DELAY TIMER (ALL TIMERS ARE ON DELAY TIMERS)

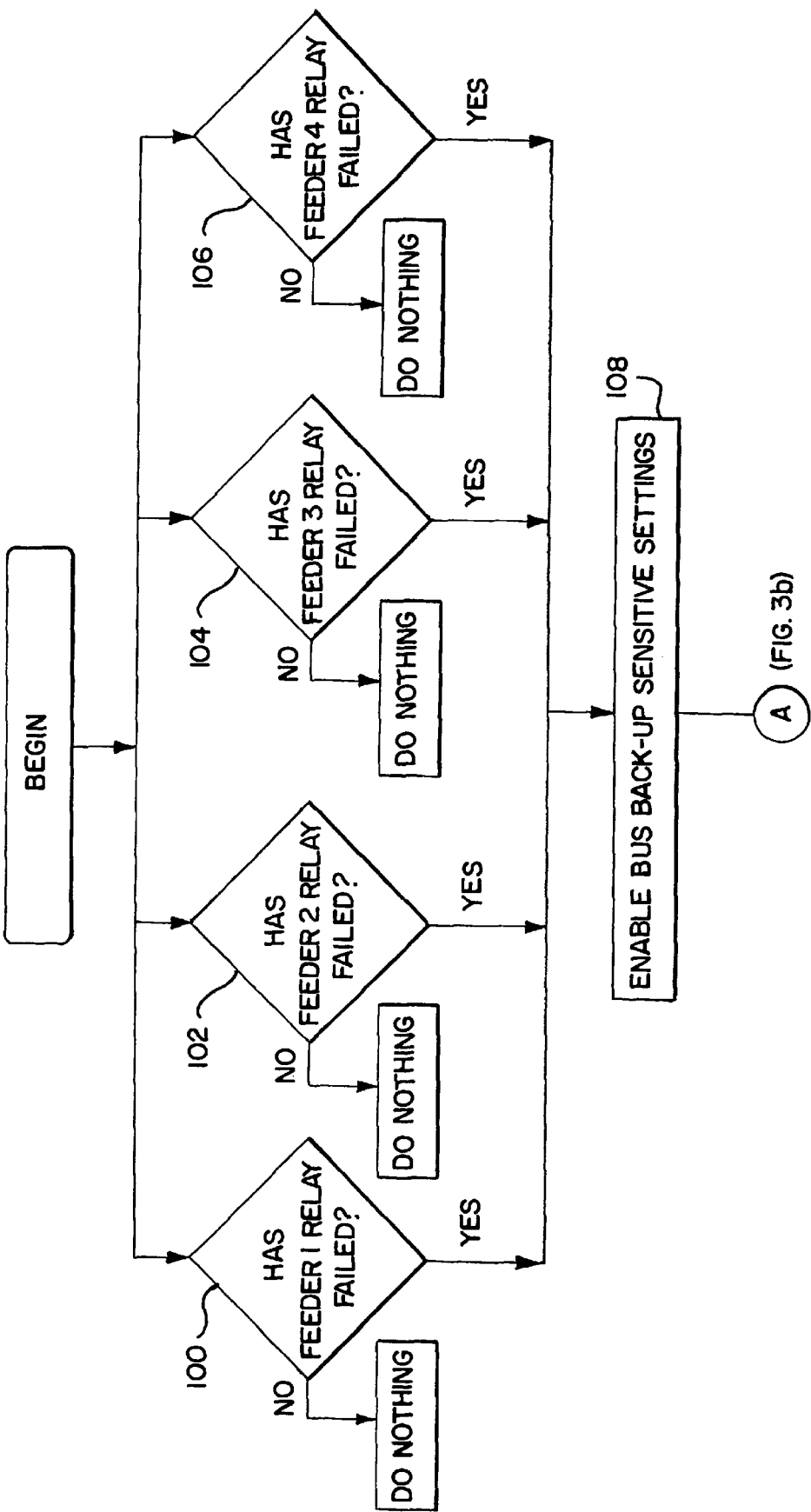

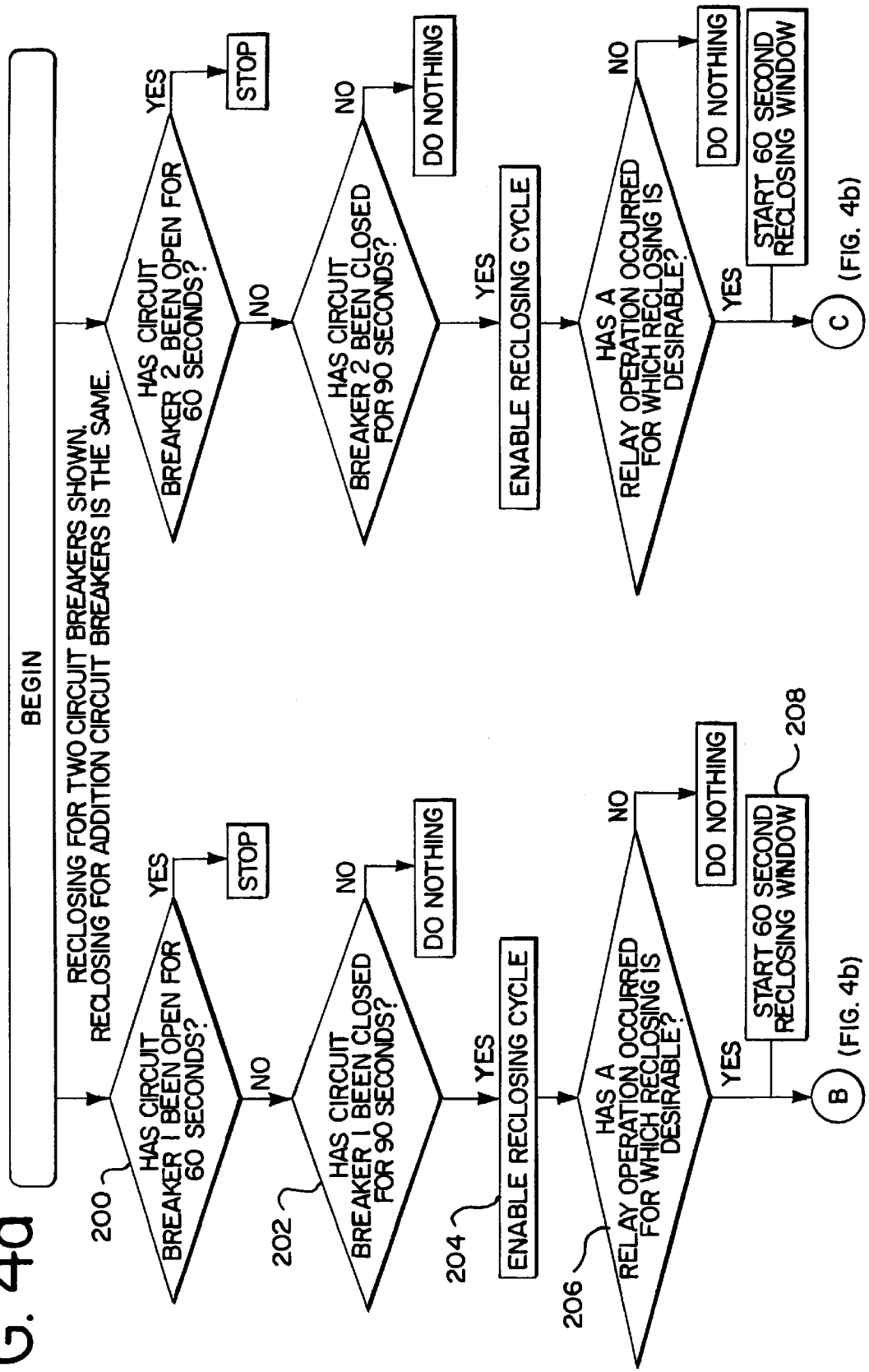

FIG. 5a

| # | Contact | Output | Input Description |
|---|---|---|---|
| | | INPUT DESCRIPTION | |
| 1 | TR 73 52b MOC | 73CB | TR 73 12.5 KV CB MECHANISM OPERATED CONTACT. CLOSED WHEN CB IS OPEN. |
| 2 | TR 73 52B TOC | 73CBRO | TR 73 12.5 KV CB TRUCK OPERATED CONTACT. CLOSED WHEN CB IS RACKED OUT. |
| 3 | BT1-2 52b MOC | 1-2CB | 12.5 KV BT 1-2-CLOSED WHEN CB IS OPEN. |
| 4 | BT 1-2 52b TOC | 1-2CBRO | 12.5 KV BT 1-2-CLOSED WHEN CB IS RACKED OUT. |
| 5 | BT2-3 52b MOC | 2-3CB | 12.5 KV BT2-3-CLOSED WHEN CB IS OPEN. |
| 6 | BT2-3 52b TOC | 2-3CBRO | 12.5 KV BT2-3-CLOSED WHEN CB IS RACKED OUT. |
| 7 | BT3-4 52b MOC | 3-4CB | 12.5 KV BT3-4-CLOSED WHEN CB IS OPEN. |
| 8 | BT3-4 52b TOC | 3-4CBRO | 12.5 KV BT3-4-CLOSED WHEN CB IS RACKED OUT |
| 9 | BT1-4 52b MOC | 1-4CB | 12.5 KV BT1-4-CLOSED WHEN CB IS OPEN. |
| 10 | BT1-4 52b TOC | 1-4CBRO | 12.5 KV BT1-4-CLOSED WHEN CB IS RACKED OUT. |
| 11 | TR 71 52b MOC | 71CB | TR71 12.5 KV CB MECHANISM OPERATED CONTACT. CLOSED WHEN CB IS OPEN. |
| 12 | TR 71 52b TOC | 71CBRO | TR71 12.5 KV CB TRUCK OPERATED CONTACT. CLOSED WHEN CB IS RACKED OUT. |
| 13 | FDR 1 52b MOC | F1CB | 12.5 KV BUS 2 FDR 1-CLOSED WHEN CB IS OPEN. |
| 14 | FDR 1 52b TOC | F1CBRO | 12.5 KV BUS 2 FDR 1-CLOSED WHEN CB IS RACKED OUT. |
| 15 | FDR 2 52b MOC | F2CB | 12.5 KV BUS 2 FDR 2-CLOSED WHEN CB IS OPEN. |
| 16 | FDR 2 52b TOC | F2CBRO | 12.5 KV BUS 2 FDR 2-CLOSED WHEN CB IS RACKED OUT. |
| 17 | FDR 3 52b MOC | F3CB | 12.5 KV BUS 2 FDR 3-CLOSED WHEN CB IS OPEN. |
| 18 | FDR 3 52b TOC | F3CBRO | 12.5 KV BUS 2 FDR 3-CLOSED WHEN CB IS RACKED OUT. |
| 19 | FDR 4 52b MOC | F4CB | 12.5 KV BUS 2 FDR 4-CLOSED WHEN CB IS OPEN. |
| 20 | FDR 4 52b TOC | F4CBRO | 12.5 KV BUS 2 FDR 4-CLOSED WHEN CB IS RACKED OUT. |
| 21 | FDR 1 TRIP | F1TRIP | FDR 1 RELAY TRIP. SEL 251 "A1" CONTACT AND DFM "OUTPUT 2" CONTACTS IN PARALLEL. |
| 22 | FDR 1 RELAY FAILURE | F1FAIL | FDR 1 DFM AND SEL 251 FAILURE CONTACTS WIRED IN SERIES. |
| 23 | FDR 2 TRIP | F2TRIP | FDR 2 RELAY TRIP. SEL 251 "A1" CONTACT AND DFM "OUTPUT 2" CONTACTS IN PARALLEL. |
| 24 | FDR 2 RELAY FAILURE | F2FAIL | FDR 2 DFM AND SEL 251 FAILURE CONTACTS WIRED IN SERIES. |
| 25 | FDR 3 TRIP | F3TRIP | FDR 3 RELAY TRIP. SEL 251 "A1" CONTACT AND DFM "OUTPUT 2" CONTACTS IN PARALLEL. |
| 26 | FDR 3 RELAY FAILURE | F3FAIL | FDR 3 DFM AND SEL 251 FAILURE CONTACTS WIRED IN SERIES. |
| 27 | FDR 4 TRIP | F4TRIP | FDR 4 RELAY TRIP. SEL 251 "A1" CONTACT AND DFM "OUTPUT 2" CONTACTS IN PARALLEL. |
| 28 | FDR 4 RELAY FAILURE | F4FAIL | FDR 4 DFM AND SEL 251 FAILURE CONTACTS WIRED IN SERIES. |
| 29 | SEL 251C TRIP | SEL251C | BUS 2 BUS BACK-UP SEL 251C TRIP. |
| 30 | TR 73 12.5 KV CB TRIP | 73CBTR | TR 73 12.5 KV CB TRIP BUS |
| 31 | 87 B2 TRIP | 87B2 | BUS 2 BUS DIFFERENTIAL TRIP |
| 32 | BT 1-2 CB TRIP | 1-2TR | 12.5 KV BT 1-2 TRIP BUS |

FIG. 5b

| Line | Contact | Coil | Description |
|---|---|---|---|
| 33 | BT 2-3 CB TRIP | 2-3 TR | 12.5 KV BT 2-3 TRIP BUS |
| 34 | TR 73 27/53 | 27/53 | TR73 27/53 WILMAR RELAY-CONTACT IS CLOSED FOR UV/OV. |
| 35 | TR 73 27 | 27 | TR 73 27 WILMAR RELAY-CONTACT IS CLOSED FOR UV. |
| 36 | TR 73 53 | 53 | TR 73 53 WILMAR RELAY-CONTACT IS CLOSED FOR OV. |
| 37 | SEL 2PG10 | 2PG10 | A1 CONTACT FROM TR 72 SEL 2PG10 RELAY |
| 38 | FDR 1 CURRENT | F1OC | FDR 1 SEL 251 "A3" CONTACT |
| 39 | FDR 2 CURRENT | F2OC | FDR 2 SEL 251 "A3" CONTACT |
| 40 | FDR 3 CURRENT | F3OC | FDR 3 SEL 251 "A3" CONTACT |
| 41 | FDR 4 CURRENT | F4OC | FDR 4 SEL 251 "A3" CONTACT |
| 42 | 83-5 aa | 71CS | TR 71/72 CIRCUIT SWITCHER (INPUT CONTACT IS CLOSED WHEN THE CIRCUIT SWITCHER IS FULLY CLOSED) |
| 43 | 83-3 bb | 73CS | TR 73/74 CIRCUIT SWITCHER (INPUT CONTACT IS CLOSED WHEN THE CIRCUIT SWITCHER IS FULLY OPEN) |
| 44 | 83-7 aa | BTCS | 138 KV BUS TIE CIRCUIT SWITCHER (INPUT CONTACT IS CLOSED WHEN THE CIRCUIT SWITCHER IS FULLY CLOSED) |
| 45 | TR 74 LOCKOUT | 74LO | TRIP FROM TR74 LOR THROUGH 83-4a CONTACT. |
| 46 | | | |
| 47 | | | |
| 48 | | | |

\* – THESE POINTS INITIATE AN OUTPUT
\*\* – VIRTUAL POINTS CONTROLLED BY SYSTEM INTEGRATOR
ODT = ON DELAY TIMER (ALL TIMERS ARE ON DELAY TIMERS)

FIG. 6a

INPUT DESCRIPTION

| # | Input | Output | Description |
|---|---|---|---|
| 1 | BT 2-352b MOC | 2-3 CB | *12.5 KV BT 2-3 MECHANISM OPERATED CONTACT -CLOSED WHEN CB IS OPEN |
| 2 | BT 2-352b TOC | 2-3 CBRO | *12.5 KV BT 2-3 TRUCK OPERATED CONTACT -CLOSED WHEN CB IS RACKED OUT. |
| 3 | BT 3-452b MOC | 3-4 CB | *12.5 KV BT 3-4-CLOSED WHEN CB IS OPEN. |
| 4 | BT 3-452b TOC | 3-4 CBRO | *12.5 KV BT 3-4-CLOSED WHEN CB IS RACKED OUT. |
| 5 | FDR 1 52b MOC | F1CB | *12.5 KV BUS 3 FDR 1-CLOSED WHEN CB IS OPEN. |
| 6 | FDR 2 52b TOC | F1CBRO | *12.5 KV BUS 3 FDR 1-CLOSED WHEN CB IS RACKED OUT. |
| 7 | FDR 2 52b MOC | F2CB | *12.5 KV BUS 3 FDR 2-CLOSED WHEN CB IS OPEN. |
| 8 | FDR 2 52b TOC | F2CBRO | *12.5 KV BUS 3 FDR 2-CLOSED WHEN CB IS RACKED OUT. |
| 9 | FDR 3 52b MOC | F3CB | *12.5 KV BUS 3 FDR 3-CLOSED WHEN CB IS OPEN. |
| 10 | FDR 3 52b TOC | F3CBRO | *12.5 KV BUS 3 FDR 3-CLOSED WHEN CB IS RACKED OUT. |
| 11 | FDR 4 52b MOC | F4CB | *12.5 KV BUS 3 FDR 4-CLOSED WHEN CB IS OPEN. |
| 12 | FDR 4 52b TOC | F4CBRO | *12.5 KV BUS 3 FDR 4-CLOSED WHEN CB IS RACKED OUT. |
| 13 | FDR 1 TRIP | F1 TRIP | *FDR 1 RELAY TRIP. SEL 251 "A1" CONTACT AND DFM "OUTPUT 2" CONTACTS IN PARALLEL |
| 14 | FDR 1 RELAY FAILURE | F1 FAIL | *FDR 1 DFM AND SEL 251 FAILURE CONTACTS WIRED IN SERIES |
| 15 | FDR 2 TRIP | F2 TRIP | *FDR 2 RELAY TRIP. SEL 251 "A1" CONTACT AND DFM "OUTPUT 2" CONTACTS IN PARALLEL |
| 16 | FDR 2 RELAY FAILURE | F2 FAIL | *FDR 2 DFM AND SEL 251 FAILURE CONTACTS WIRED IN SERIES |
| 17 | FDR 3 TRIP | F3 TRIP | *FDR 3 RELAY TRIP. SEL 251 "A1" CONTACT AND DFM "OUTPUT 2" CONTACTS IN PARALLEL |
| 18 | FDR 3 RELAY FAILURE | F3 FAIL | *FDR 3 DFM AND SEL 251 FAILURE CONTACTS WIRED IN SERIES |
| 19 | FDR 4 TRIP | F4 TRIP | *FDR 4 RELAY TRIP. SEL 251 "A1" CONTACT AND DFM "OUTPUT 2" CONTACTS IN PARALLEL |
| 20 | FDR 4 RELAY FAILURE | F4 FAIL | *FDR 4 DFM AND SEL 251 FAILURE CONTACTS WIRED IN SERIES |
| 21 | SEL 251C TRIP | SEL251C | *BUS 3 BUS BACK-UP SEL 251C TRIP |
| 22 | 87B3 TRIP | 87B3 | *BUS 3 BUS DIFFERENTIAL TRIP |
| 23 | BT 2-3 CB TRIP | 2-3 TR | *12.5 KV BT 2-3 TRIP BUS |
| 24 | BT 3-4 CB TRIP | 3-4 TR | *12.5 KV BT 3-4 TRIP BUS |
| 25 | FDR 1 CURRENT | F1OC | *FDR 1 SEL 251 "A3" CONTACT |
| 26 | FDR 2 CURRENT | F2OC | *FDR 2 SEL 251 "A3" CONTACT |
| 27 | FDR 3 CURRENT | F3OC | *FDR 3 SEL 251 "A3" CONTACT |
| 28 | FDR 4 CURRENT | F4OC | *FDR 4 SEL 251 "A3" CONTACT |
| 29 | | | |
| 30 | | | |
| 31 | | | |
| 32 | | | |

\* – THESE POINTS INITIATE AN OUTPUT
ODT = ON DELAY TIMER (ALL TIMERS ARE ON DELAY TIMERS)

FIG. 7a

| # | Contact | Coil | INPUT DESCRIPTION |
|---|---|---|---|
| 1 | TR71 52b MOC | 71CB | TR71 12.5 KV CB MECHANISM OPERATED CONTACT. CLOSED WHEN CB IS OPEN. |
| 2 | TR7152B TOC | 71CBRO | TR71 12.5 KV CB TRUCK OPERATED CONTACT. CLOSED WHEN CB IS RACKED OUT. |
| 3 | BT3-4 52b MOC | 3-4CB | 12.5 KV BT 3-4-CLOSED WHEN CB IS OPEN. |
| 4 | BT3-4 52b TOC | 3-4CBRO | 12.5 KV BT 3-4-CLOSED WHEN CB IS RACKED OUT. |
| 5 | BT 1-4 52b MOC | 1-4CB | 12.5 KV BT 1-4-CLOSED WHEN CB IS OPEN. |
| 6 | BT 1-4 52b TOC | 1-4CBRO | 12.5 KV BT 1-4-CLOSED WHEN CB IS RACKED OUT. |
| 7 | BT 1-2 52b MOC | 1-2CB | 12.5 KV BT 1-2-CLOSED WHEN CB IS OPEN. |
| 8 | BT 1-2 52b TOC | 1-2CBRO | 12.5 KV BT 1-2-CLOSED WHEN CB IS RACKED OUT. |
| 9 | BT 2-3 52b MOC | 2-3CB | 12.5 KV BT 2-3-CLOSED WHEN CB IS OPEN. |
| 10 | BT 2-3 52b TOC | 2-3CBRO | 12.5 KV BT 2-3-CLOSED WHEN CB IS RACKED OUT. |
| 11 | TR73 52b MOC | 73CB | TR 73 12.5 KV CB MECHANISM OPERATED CONTACT. CLOSED WHEN CB IS OPEN. |
| 12 | TR73 52b TOC | 73CBRO | TR 73 12.5 KV CB TRUCK OPERATED CONTACT. CLOSED WHEN CB IS RACKED OUT. |
| 13 | FDR 1 52b MOC | F1CB | 12.5 KV BUS 4 FDR 1-CLOSED WHEN CB IS OPEN. |
| 14 | FDR 1 52b TOC | F1CBRO | 12.5 KV BUS 4 FDR 1-CLOSED WHEN CB IS RACKED OUT. |
| 15 | FDR 2 52b MOC | F2CB | 12.5 KV BUS 4 FDR 2-CLOSED WHEN CB IS OPEN. |
| 16 | FDR 2 52b TOC | F2CBRO | 12.5 KV BUS 4 FDR 2-CLOSED WHEN CB IS RACKED OUT. |
| 17 | FDR 3 52b MOC | F3CB | 12.5 KV BUS 4 FDR 3-CLOSED WHEN CB IS OPEN. |
| 18 | FDR 3 52b TOC | F3CBRO | 12.5 KV BUS 4 FDR 3-CLOSED WHEN CB IS RACKED OUT. |
| 19 | FDR 4 52b MOC | F4CB | 12.5 KV BUS 4 FDR 4-CLOSED WHEN CB IS OPEN. |
| 20 | FDR 4 52b TOC | F4CBRO | 12.5 KV BUS 4 FDR 4-CLOSED WHEN CB IS RACKED OUT. |
| 21 | FDR 1 TRIP | F1TRIP | FDR 1 RELAY TRIP. SEL251"A" CONTACT AND DFM "OUTPUT 2" CONTACTS IN PARALLEL |
| 22 | FDR 1 RELAY FAILURE | F1FAIL | FDR 1 DFM AND SEL 251 FAILURE CONTACTS WIRED IN SERIES. |
| 23 | FDR 2 TRIP | F2TRIP | FDR 2 RELAY TRIP. SEL251"A" CONTACT AND DFM "OUTPUT 2" CONTACTS IN PARALLEL |
| 24 | FDR 2 RELAY FAILURE | F2FAIL | FDR 2 DFM AND SEL 251 FAILURE CONTACTS WIRED IN SERIES. |
| 25 | FDR 3 TRIP | F3TRIP | FDR 3 RELAY TRIP. SEL251"A" CONTACT AND DFM "OUTPUT 2" CONTACTS IN PARALLEL |
| 26 | FDR 3 RELAY FAILURE | F3FAIL | FDR 3 DFM AND SEL 251 FAILURE CONTACTS WIRED IN SERIES. |
| 27 | FDR 4 TRIP | F4TRIP | FDR 4 RELAY TRIP. SEL251"A" CONTACT AND DFM "OUTPUT 2" CONTACTS IN PARALLEL |
| 28 | FDR 4 RELAY FAILURE | F4FAIL | FDR 4 DFM AND SEL 251 FAILURE CONTACTS WIRED IN SERIES. |
| 29 | SEL251C TRIP | SEL251C | BUS 4 BUS BACK-UP SEL 251C TRIP. |
| 30 | TR 71 12.5KV CB TRIP | 71CBTR | TR71 12.5 KV CB TRIP BUS |
| 31 | 87 B4 TRIP | 87B4 | BUS 4 BUS DIFFERENTIAL TRIP |
| 32 | CB TRIP | 3-4TR | 12.5 KV BT 3-4 TRIP BUS |

FIG. 7b

INPUT DESCRIPTION

| Rung | Input | Output | Description |
|---|---|---|---|
| 33 | BT 1-4 CB TRIP | 1-4TR | 12.5 KV BT 1-4 TRIP BUS |
| 34 | TR 71 27/53 | 27/53 | TR 71 27/53 WILMAR RELAY-CONTACT IS CLOSED FOR UV/OV. |
| 35 | TR 71 27 | 27 | TR 71 27 WILMAR RELAY-CONTACT IS CLOSED FOR UV. |
| 36 | TR 71 53 | 53 | TR 71 53 WILMAR RELAY-CONTACT IS CLOSED FOR OV. |
| 37 | SEL 2PGIO | 2PGIO | AI CONTACT FROM TR 71 SEL 2PGIO RELAY |
| 38 | FDR 1 CURRENT | F1OC | FDR 1 SEL 251 "A3" CONTACT |
| 39 | FDR 2 CURRENT | F2OC | FDR 2 SEL 251 "A3" CONTACT |
| 40 | FDR 3 CURRENT | F3OC | FDR 3 SEL 251 "A3" CONTACT |
| 41 | FDR 4 CURRENT | F4OC | FDR 4 SEL 251 "A3" CONTACT |
| 42 | 83-3aa | 73CS | TR 73/74 CIRCUIT SWITCHER (INPUT CONTACT IS CLOSED WHEN THE CIRCUIT SWITCHER IS FULLY CLOSED) |
| 43 | 83-5bb | 71CS | TR 71/72 CIRCUIT SWITCHER (INPUT CONTACT IS CLOSED WHEN THE CIRCUIT SWITCHER IS FULLY OPEN) |
| 44 | 83-7aa | BTCS | 138 KV BUS TIE CIRCUIT SWITCHER (INPUT CONTACT IS CLOSED WHEN THE CIRCUIT SWITCHER IS FULLY CLOSED) |
| 45 | TR 72 LOCKOUT | 72LO | TRIP FROM TR 72 LOR THROUGH 83-2a CONTACT. |
| 46 | | | |
| 47 | | | |
| 48 | | | |

\* - THESE POINTS INITIATE AN OUTPUT

\*\* - VIRTUAL POINTS CONTROLLED BY SYSTEM INTEGRATOR

ODT = ON DELAY TIMER (ALL TIMERS ARE ON DELAY TIMERS)

SYSTEM AND METHOD FOR PROVIDING BACKUP PROTECTION FOR CIRCUIT BREAKER FAILURE

A microfiche appendix, containing two (2) sheets of microfiche (145 frames total), is included with this application. The contents of the microfiche appendix are hereby expressly incorporated herein by reference.

A portion of the disclosure of this patent document contains material which is subject to copyright protection. The copyright owner has no objection to the reproduction by anyone of the patent document or the patent disclosure, as it appears in the Patent and Trademark Office patent files or records, but otherwise reserves all copyright rights whatsoever.

FIELD OF THE INVENTION

This invention relates to a system for controlling a power substation and, more particularly, to improvements in the controls employed in power distribution substations that provide backup protection for feeder circuit breaker failure.

BACKGROUND OF THE INVENTION

Power substations typically include a plurality of buses each having a plurality of feeders coupled thereto. The feeders are coupled to and supply power typically to industrial and residential customers. Each feeder typically has at least one circuit breaker and a relay associated with that circuit breaker. The relay detects a predetermined condition, such as a fault, and sends a signal to open or "trip" the circuit breaker associated with that relay so that the feeder can no longer deliver power to the load coupled to it.

As a safety precaution, backup protection must be provided for relay and circuit breaker failure or malfunction. Conventionally, backup protection used in power substations required dedicated backup devices and dedicated wiring which increased the cost of providing backup protection and increased the amount of space required to implement such backup protection. In addition, conventional backup protection systems indiscriminately rendered more of the substation inoperable than was necessary. For example, conventional backup protection for the failure of the relays in the feeders included at least one additional relay located upstream of the feeder relays. If a fault occurred on a particular feeder and the relay associated with that feeder malfunctioned or failed to detect the fault, the upstream relay would eventually detect the fault and trip all of the circuit breakers downstream of it. Thus, all of the feeders would be disabled, not just the feeder in which the relay failed.

Conventional backup protection for circuit breakers in a power substation typically provided backup protection for the transformer's circuit breakers and not the individual circuit breakers located in the feeders. Backup systems required one device, such as a breaker failure relay per circuit breaker to detect the malfunction or failure of the circuit breaker associated with the device. The device would monitor the status of a circuit breaker associated with the device and start a timer. If the circuit breaker was not open when the timer expired, the device, which was typically externally wired to additional devices that would be wired to trip additional circuit breakers, would generate an output signal to the other devices to trip the additional circuit breakers. Alternatively, some devices monitored the current flowing through the circuit breaker associated with the device to determine if the circuit breaker failed to open.

Because of the need for additional devices and wiring, the space required to implement such backup protection systems increased as well as the cost of implementing such systems.

In addition, to reclose circuit breakers once the predetermined condition had been cleared, conventional systems utilized a separate device such as a reclosing relay associated with each circuit breaker. The device would start a timing sequence any time the circuit breaker associated with it opened. When the timing sequence expired, and assuming other supervisory conditions were satisfied, the device would output a signal to close the circuit breaker associated with it. As already discussed with reference to the backup protection for circuit breaker failure, because one device was associated with each circuit breaker, the same disadvantages regarding space and cost exist.

It is thus desirable to provide a control system that detects the failure of a relay in a feeder and generates a backup command to trip only the circuit breaker associated with the failed relay thereby leaving the other feeders in which no failure or malfunction has been detected unaffected. It is also desirable to provide a control system that is integrated and provides one time reference to allow for a more uniform response. It is also desirable to provide a control system that allows for more accurate and uniform reclosing of circuit breakers after a fault has been cleared. Finally, it is desirable to provide a control system that requires minimal space for its implementation, that is less expensive than conventional backup protection systems and can be easily reconfigured to changing requirements.

SUMMARY OF THE INVENTION

According to a first aspect of the present invention there is provided a system for detecting the failure of a circuit breaker in a power substation, the system includes at least one bus having at least two feeders where each feeder has at least one circuit breaker. The system also includes at least one relay associated with each circuit breaker of the at least two feeders. The relay is energized upon the detection for a predetermined event. The system also includes a programmable controller having a plurality of inputs and a plurality of outputs. The programmable controller has inputs coupled to each circuit breaker and the relay associated therewith and has outputs coupled to each of the circuit breakers. The programmable controller is programmed to detect the energization of a relay and output a signal to the circuit breaker associated with that relay to cause the circuit breaker to trip and also initiate a timer. If the circuit breaker does not trip within an allotted time period a signal is output to all of the circuit breakers on the bus to trip.

According to a second aspect of the present invention there is provided a system for detecting the failure of a circuit breaker in a power substation. The system includes at least one bus having at least two feeders wherein each feeder has at least one circuit breaker and means coupled to the at least one bus for outputting a signal to a circuit breaker to trip and also initiate a timer wherein if the circuit breaker does not trip within an allotted time period a signal is output to all of the circuit breakers on the at least one bus to trip.

According to a third aspect of the present invention there is provided a method of detecting the failure of a circuit breaker in a power substation. The method includes the steps of providing at least one bus having at least two feeders where each feeder has at least one circuit breaker, outputting a first signal to trip one of the circuit breakers and initiate a timer at the time the first signal is output to trip one of the circuit breakers wherein the timer has a predetermined time period, detecting whether the circuit breaker has tripped and if it has not, outputting a second signal to trip all the circuit breakers on the at least one bus.

According to a fourth aspect of the present invention there is provided a system for detecting the failure of a circuit breaker in a power substation. The system includes at least one bus having at least two feeders where each feeder has at least one circuit breaker, and a programmable controller having a plurality of inputs and a plurality of outputs. The programmable controller has inputs coupled to each circuit breaker of the at least two feeders and outputs coupled to each circuit breaker of the at least two feeders. The programmable controller is programmed to trip a circuit breaker of one of the at least two feeders upon the detection of a predetermined event and also initiate a timer upon the detection of the predetermined event wherein if the programmable controller detects that the circuit breaker has tripped, the timer is disabled but if the programmable controller has not detected a trip in the circuit breaker and the timer has timed out, the programmable controller outputs a signal to all of the circuit breakers on the bus.

BRIEF DESCRIPTION OF THE DRAWINGS

FIGS. 2a–2d, 5a–5f, 6a–6d and 7a–7f illustrate generally the ladder logic programmed in a programmable controller for a power substation according to a preferred embodiment of the present invention.

FIGS. 3a–3b are flowcharts illustrating the feeder relay backup protection according to a preferred embodiment of the present invention.

FIGS. 4a–4d are flowcharts illustrating the circuit breaker reclosing operation.

DETAILED DESCRIPTION OF THE PRESENTLY PREFERRED EMBODIMENTS

Figure 1:
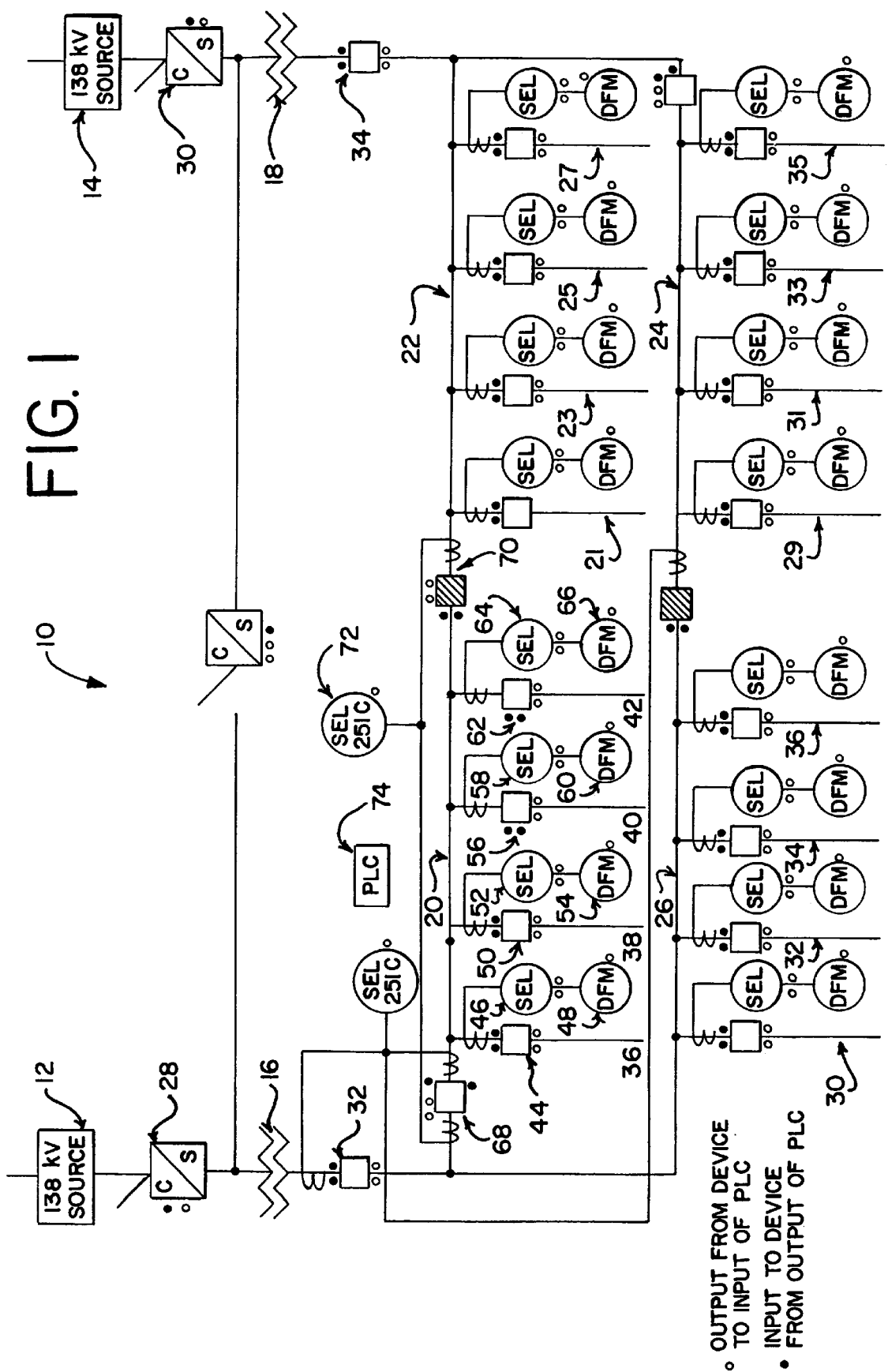
FIG. 1 is a schematic diagram of the components and wiring of a power substation having a control system according to a preferred embodiment of the present invention.

FIG. 1 is a schematic diagram of the components and wiring of a power substation having a control system according to a preferred embodiment of the present invention. The configuration of the power substation 10 will first be described followed by a description of its operation. In a preferred embodiment, the power substation 10 includes two sources of power 12 and 14; two transformers 16 and 18; and a first bus 20, a second bus 22, a third bus 24 and a fourth bus 26. Coupled between the power sources 12 and 14 and the transformers 16 and 18 are circuit switchers 28 and 30. Coupled between circuit switcher 28 and transformer 16 and circuit switcher 30 and transformer 18 is circuit switcher 29. Downstream of the transformers 16 and 18 are circuit breakers 32 and 34. The first bus 20 preferably includes four feeders 36, 38, 40 and 42. Feeder 36 preferably includes a circuit breaker 44, a first relay 46 and a second relay 48. The feeders are coupled to a load such as industrial and residential customers and supply power to the load. Also provided on the first bus is bus 1-4 circuit breaker 68 which couples the first bus 20 to the fourth bus 26 and bus 1-2 circuit breaker 70 which couples the first bus 20 to the second bus 22. Circuit breaker 68 is shown as a hollow box to indicate it is normally closed and circuit breaker 70 is shown as a shaded box to indicate that it is normally open. The first bus 20 also has a backup relay 72 coupled across the first bus 20 as shown.

A programmable controller 74 is also coupled across the first bus 20. In a preferred embodiment the programmable controller 74 is a programmable logic controller (PLC) such as Model No. 985 commercially available from Modicon, Inc. of North Andover, Mass. PLC 74 has a thirty two (32) 125 VDC input card and two eight (8) point high current output cards thereby providing sixteen (16) outputs. In FIG. 1 the hollow circles located next to various devices, e.g., circuit breakers, relays and circuit switchers, indicate an output of the device to an input of the programmable controller 74. The solid circles indicate an input to the device from an output of the programmable controller 74.

In a preferred embodiment, the following components are used. With respect to feeder 36, circuit breaker 44 is a vacuum circuit breaker; relay 46 is a conventional overcurrent relay such as SEL 251, commercially available from Schweiter Engineering Laboratories Inc., of Pullman, Wash.; relay 48 is microprocessor controlled relay such as Model No. DFM351EB available from General Electric or that which is described in U.S. Pat. No. 5,041,737 which is specifically incorporated herein by reference. Relay 48 preferably includes an algorithm to detect downed conductors. As previously described, the other feeders are similarly configured and thus the same components are used. While two relays are illustrated, the present invention is not limited to such an embodiment. Alternately, only one relay may be used or more than two relays may be used.

The second, third and fourth feeders preferably have identical configurations as illustrated and thus will not be described in detail.

The feeder relays monitor their associated feeder for the occurrence of a predetermined condition, such as an overcurrent situation or a downed conductor. If a relay and/or relays detect the predetermined condition, a signal is sent to the associated circuit breaker commanding the circuit breaker to open or "trip". If the circuit breaker trips, power is prevented from flowing through the feeder to its load. Because the feeder relays and circuit breakers may fail or malfunction, backup protection must be provided. In a preferred embodiment of the present invention, the feeder relays and circuit breakers of the power substation are monitored by the programmable controller 74 to detect failures and/or malfunctions as will be described in detail hereinafter. The backup protection for feeder relay failure will first be described followed by a description of the backup protection for circuit breaker failure and the circuit breaker reclosing scheme.

The second, third and fourth buses preferably have identical configurations as illustrated and thus will not be described in detail. While a backup relay and PLC are not shown with respect to these buses, they would also have such devices. Alternatively, one PLC may be coupled to all of the buses to control the operation thereof.

Figure 2B:
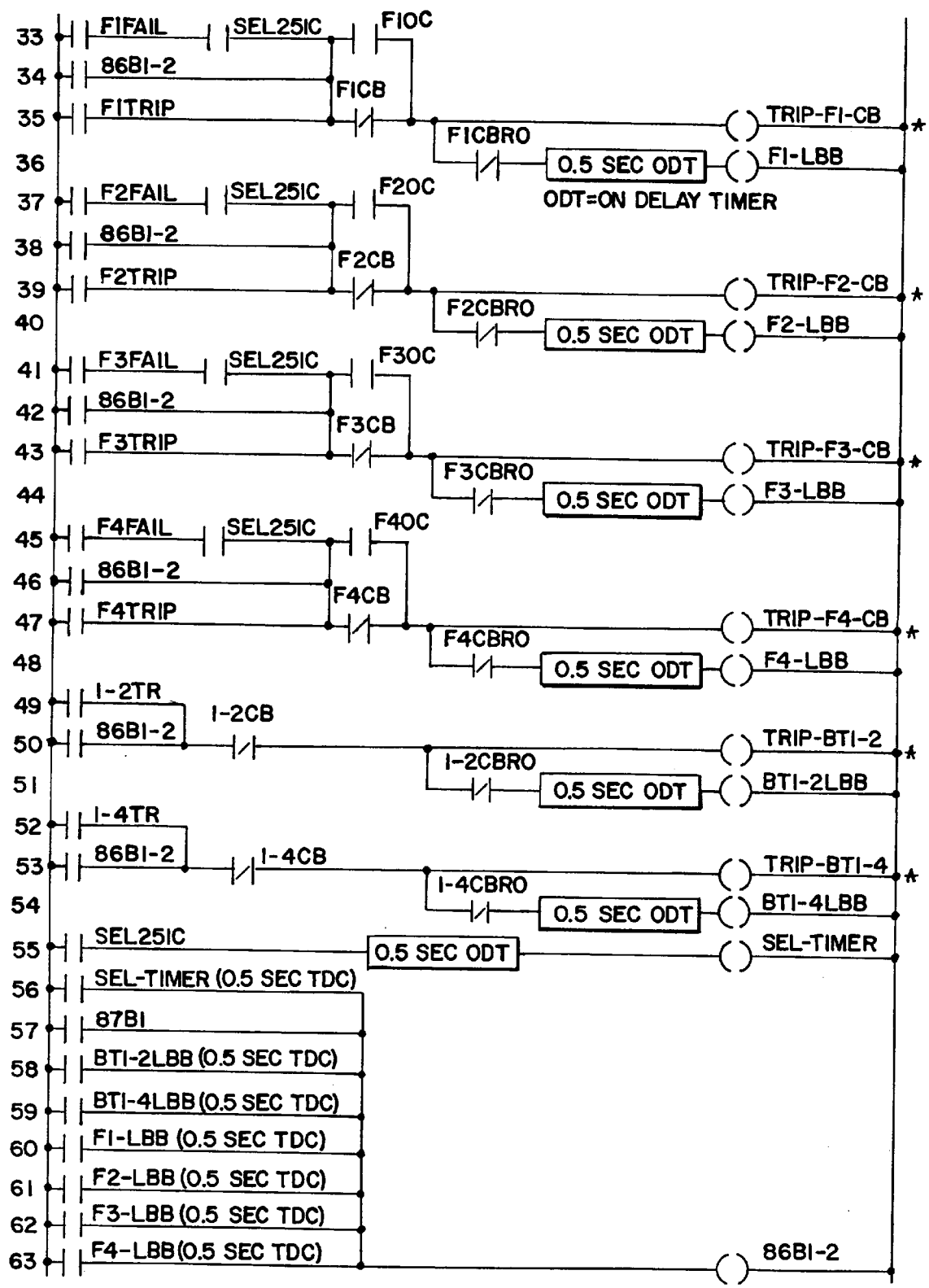

FIGS. 2a–2d illustrate the ladder logic programmed in the PLC 74 for the first bus 20 according to a preferred embodiment of the present invention. Because of the particular type of PLC chosen, the ladder logic is read from the top of the page to the bottom. On the left hand side of FIG. 2a are the 32 inputs referenced to by line numbers 1–32 and on the right hand side of FIG. 2a is a description of those inputs. As can be seen inputs 29–32 are not used.

The symbol ⊣⊢ represents a normally open contact which passes power when its referenced coil or input is on. The symbol ⊣⊬ represents a normally closed contact which passes power when its referenced coil or input is off. Contacts are used to pass or inhibit power flow in a ladder logic program. The symbol -( )- represents a coil which turns off when power is removed. A coil, as used in the ladder logic diagram, is a discrete output value which may be used internally in the logic program or externally to an output unit in the control system. A coil is either on or off depending on power flow. When a coil is on, it either passes power to a discrete output circuit or changes the state of an internal relay contact in state RAM.

Lines 1,3,5,7,9 and 11 are the circuit breaker mechanism operated contacts (MOC) for the six (6) circuit breakers coupled to the first bus 20. In particular, line 1 includes contact BT1-2 52b MOC and coil 1-2CB for circuit breaker 70. Contact BT1-2 52b MOC closes when circuit breaker 70 opens thereby energizing coil 1-2 CB. Line 3 includes contact BT1-4 52b MOC and coil 1-4 CB. Contact BT1-4 52b MOC closes when circuit breaker 68 opens thereby energizing coil 1-4 CB. Line 5 includes contact FDR1 52b MOC and coil F1CB. Contact FDR1 52b MOC closes when circuit breaker 44 opens thereby energizing coil F1CB. Line 7 includes contact FDR2 52b MOC and coil F2CB. Contact FDR2 52b MOC closes when circuit breaker 50 opens thereby energizing coil F1CB. Line 9 includes contact FDR 3 52b MOC and coil F3CB. Contact FDR 3 52b MOC closes when circuit breaker 56 opens thereby energizing coil F3CB. Line 11 includes contact FDR 4 52b MOC and coil F4CB. Contact FDR 4 52b MOC closes when circuit breaker 62 opens thereby energizing coil F4CB.

Lines 2, 4, 6, 8, 10 and 12, respectively include the trunk operated contacts (TOC) for the same six circuit breakers. These contacts are closed when the circuit breaker is taken out of operation, or "racked out," of its normal position, for example, for repair thereby energizing the coils associated with the respective contact.

Lines 13, 15, 17 and 19 are the trip output contacts from the feeder relays. More particularly, these contacts are the OUTPUT 2 contact of relays 48, 54, 60 and 66 and the A1 contact of relays 46, 52, 58 and 64 coupled in parallel. The OUTPUT 2 contact of relays 48, 54, 60 and 66 is preferably programmed to close for overcurrent faults only and the A1 contact of relays 46, 52, 58 and 64 is preferably programmed to close for overcurrent conditions only. Thus, if either relay of a feeder detects an overcurrent condition, a contact on one of the lines 13, 15, 17 or 19 closes depending upon which feeder was affected. The OUTPUT 1 contact of relays 48, 54, 60 and 66 is preferably programmed to close for overcurrent faults and downed conductor conditions. It is directly wired to its respective circuit breaker. Lines 14, 16, 18 and 20 include the feeder relay failure contacts for relays 48, 54, 60, 66 and relays 46, 52, 58 and 64 coupled in series. The contact on line 14, 16, 18 or 20 will close only if both relays of a feeder fail.

Line 21 includes contact SEL 251C TRIP and coil SEL 251C. Contact SEL 251C TRIP closes when backup relay 72 is energized thereby energizing coil SEL 251C. Line 22 includes contact 87B1 TRIP and coil 87B1. Contact 87B1 TRIP closes when bus differential relay (not shown) is energized thereby energizing coil 87B1. Line 23 includes contact BT 1-2 CBTRIP and coil 1-2 TR. Contact BT 1-2CB TRIP closes when circuit breaker 70 trips thereby energizing coil 1-2TR. Line 24 includes contact BT1-4 CBTRIP and coil 1-4TR. Contact BT 1-4 CBTRIP closes when circuit breaker 68 trips thereby energizing coil 1-4TR. Line 25 includes contact FDR 1 CURRENT and coil F10C. Contact FDR1 CURRENT closes when current is detected flowing through circuit breaker 44. Line 26 includes contact FDR 2 CURRENT and coil F20C. Contact FDR2 CURRENT closes when current is detected flowing through circuit breaker 44. Line 27 includes contact FDR 3 CURRENT and coil F30C. Contact FDR 3 CURRENT closes when current is detected flowing in circuit breaker 56. Line 28 includes contact FDR 4 CURRENT and coil F40C. Contact FDR 4 CURRENT closes when current is detected flowing in circuit breaker 62. In a preferred embodiment lines 25–28 are coupled to the A3 contact of relays 46, 52, 58 and 64 respectively.

Figure 2C:
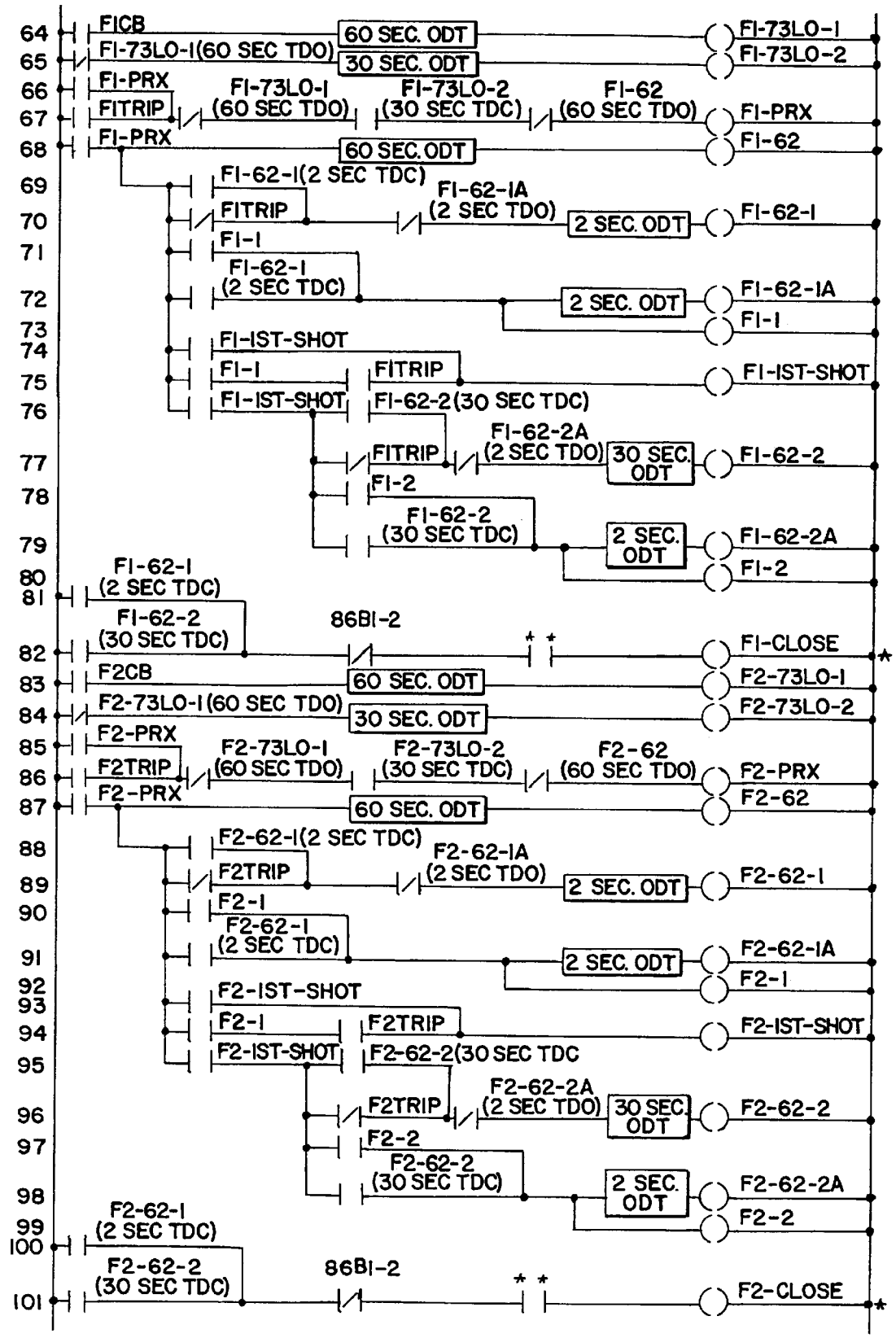
Figure 2D:
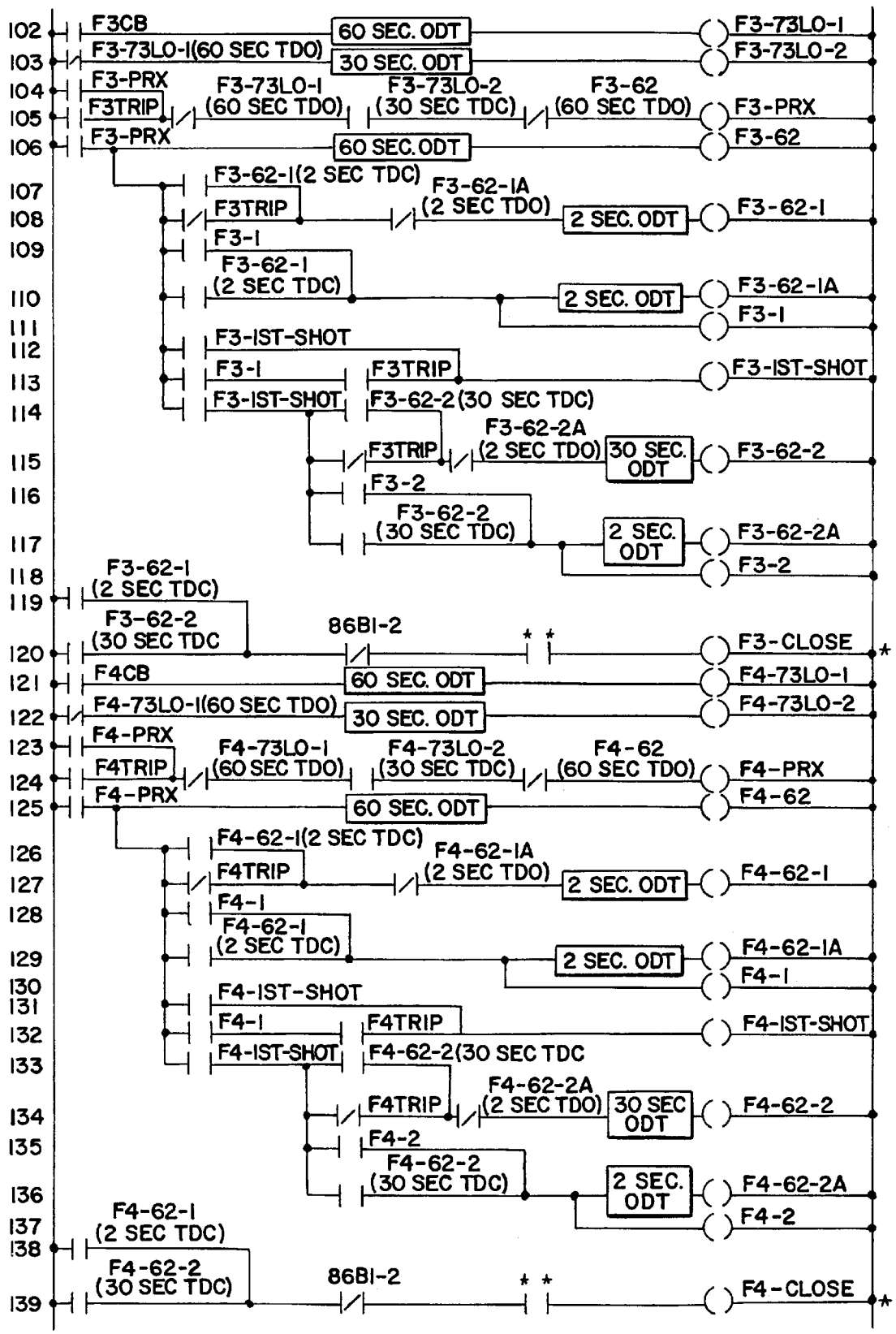

FIGS. 2b–2d illustrate the logic programmed in PLC 74 to perform the relay and circuit breaker backup protection and circuit breaker reclosing for the first bus 20 according to a preferred embodiment of the present invention. An asterisk on the right hand side of FIGS. 2b–2d indicates a command signal generated by PLC 74 for some action to occur and be output to a particular device or devices.

Figure 3B:
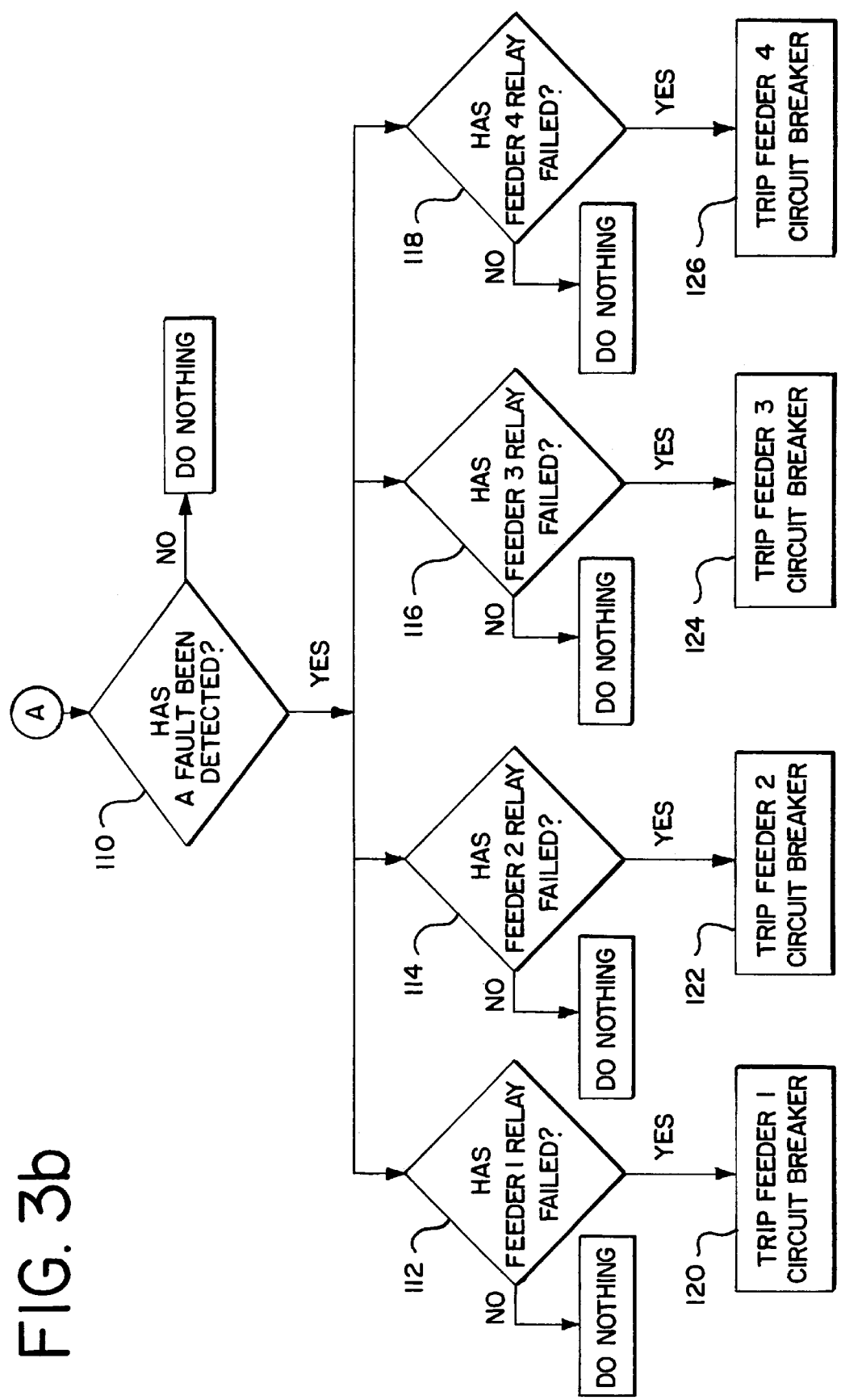

FIGS. 3a and 3b are flowcharts illustrating the feeder relay backup protection for the first bus 20 according to a preferred embodiment of the present invention. FIG. 2b illustrates the ladder logic that implements the relay and circuit breaker backup protection. The backup protection for the feeder relays and circuit breakers will now be described with reference to FIGS. 2b and 3a–3b. In particular, lines 33–35 illustrate the programmed logic for tripping circuit breaker 44 on feeder 36 even if the relays of that feeder have failed. Lines 37–39 illustrate the programmed logic for tripping circuit breaker 50 on feeder 38 even if the relays of that feeder have failed. Lines 41–43 illustrate the programmed logic for tripping circuit breaker 56 on feeder 40 even if the relays of that feeder have failed. Lines 45–47 illustrate the programmed logic for tripping circuit breaker 62 on feeder 42 even if the relays for that feeder have failed. Lines 58–63 illustrate a portion of the programmed logic for tripping all of the circuit breakers on bus 20 if a particular circuit breaker fails to open on command. Since the backup protection is identical for all of the feeders, only the backup protection for feeder 36 will be described in detail.

Under normal conditions if either relay 46 or 48 detect a fault, preferably an overcurrent condition, the F1TRIP coil on line 13 is energized which closes contact F1TRIP on line 35. Contact F1CB on line 35 is normally closed and thus TRIP-F1-CB coil is energized which generates a command signal to trip circuit breaker 44 as indicated by the asterisk on the right hand side of the ladder logic. In addition, contact F1CBRO on line 36 is normally closed unless the circuit breaker is "racked out" of its normal position (see line 6). Thus, in addition to generating a command signal to trip circuit breaker 44, a timer is also started as indicated on line 36. Preferably the timer is a 0.5 second on delay timer, as are all other timers in the ladder logic shown in FIG. 2b. If the circuit breaker opens before the timer times out, contacts F1CB and F10C open which stops the timer. If the circuit breaker fails to open before the timer times out, coil F1-LBB on line 36 is energized which closes the F1-LBB contact on line 60 thereby energizing coil 86B1-2 which generates a command signal to trip circuit breakers 44, 50, 56, 62, 68, 70 on the first bus 20 because it causes contact 86 B1-2 on lines 34, 38, 42, 46, 50 and 53 to close.

Even if both relays fail to detect a fault or malfunction, the circuit breaker 44 can still be tripped by backup relay 72. If both feeder relays fail to detect a fault or malfunction, F1FAIL coil on line 14 is energized which closes the F1FAIL contact on line 33. If the backup relay 72 detects a fault or overcurrent condition on the first bus 20, the SEL251C coil on line 21 is energized which closes that contact on line 33 thus causing TRIP-F1-CB coil to be energized to generate a command signal to trip the circuit breaker 44 as well as start the timer on line 36. The same sequence of events as already described above then occurs. Thus, if a circuit breaker on the bus does not open in response to a command to open in time, all of the circuit breakers on that bus are tripped. Thus, lines 33–48 are the ladder logic that provides the backup protection for relay and circuit breaker failure or malfunction.

Lines 49–51 and 52–54 are the ladder logic for tripping circuit breakers 70 and 68 respectively and the backup protection if those circuit breakers fail to open on command. Since the logic of lines 49–51 is similar to that of lines 52–54, only lines 49–51 need be described. Normally, circuit breaker 70 will receive a signal from a relay (not shown) to trip and open. If it receives such a signal contact BT 1-2 CBTRIP on line 23 is closed which energizes coil 1-2TR on line 23 thereby closing contact 1-2TR on line 49. Contract 1-2CB on line 50 is normally closed thus energizing coil TRIP-BT 1-2 which outputs a command to trip circuit breaker 70. Also, if circuit breaker 70 is not "racked out" of its position, contact 1-2 CBRO on line 51 is closed thereby starting a timer If circuit breaker 70 has not opened at the end of the timer cycle, coil BT1-2LBB on line 51 is energized which closes contact BT1-2 LBB contact on line 58 which energizes coil 86 B1-2 and, as already described, generates a command to trip all of the circuit breakers on the first bus.

Line 55 is a backup when backup relay 72 contact SEL251C closes a timer is started which energizes coil SEL-TIMER. Energizing coil SEL-TIMER on line 55 closes contact SEL-TIMER on line 58 which energizes coil 86B1-2 on line 63 thereby commanding all of the circuit breakers to trip.

With reference to FIGS. 3a and 3b, simplified flowcharts illustrate the logic programmed in PLC 74 for backup protection for relay failure. PLC 74 determines at boxes 100, 102, 103, 104 if any of the feeder relays on a bus have failed. If none have, no action is taken. If a failure has been detected, control is passed to block 108 which enables the backup relay 72. At block 110 it is determined whether backup relay 72 has detected a fault. If not, no action is taken. If a fault has been detected, control is passed to blocks 112, 114, 116 and 118 where it is determined which feeder relay failed. Depending upon the determination in boxes 112–118 the circuit breaker associated with the failed feeder relay will be sent a command to trip.

The backup protection system according to the preferred embodiments of the present invention is implemented in a simplified manner by using the programmable controller 74 to monitor the operation of the power substation instead of requiring individual devices associated with each circuit breaker and the requisite additional wiring. In addition, specific circuit breakers can be commanded to trip depending upon which feeder relay failed instead of indiscriminately commanding all of the circuit breakers to trip.

FIGS. 2c and 2d illustrate the ladder logic for reclosing the feeder circuit breakers on the first bus 20. More particularly, lines 64–82 describe the ladder logic for closing circuit breaker 44, lines 83–101 describe the ladder logic for closing circuit breaker 50, lines 102–120 describe the ladder logic for closing circuit breaker 56 and lines 121–139 are the ladder logic for closing circuit breaker 62. Since the logic for reclosing the circuit breakers is the same, only the logic in lines 64 through 82 will be described. FIGS. 4a–4d are flowcharts of the ladder logic shown in FIGS. 2c and 2d illustrating the circuit breaker reclosing system.

A detailed description of the reclosing of circuit breaker 44 will now be given. With reference to FIG. 4a, PLC 74 determines at block 200 whether the circuit breaker has been open for 60 seconds. If it has, no action is taken. If it has not, control is passed to block 202 which determines whether the circuit breaker has been closed for 90 seconds. If it has not, no action is taken. If it has, the reclosing cycle is enabled at block 204. Once the reclosing cycle has been enabled at block 204 it is determined at block 206 whether a relay operation has occurred for which reclosing is desired. If not, no action is taken. If a relay operation has occurred, control is passed to block 208 which starts a reclosing window lasting preferably 60 seconds.

Referring back to FIG. 2c the ladder logic that implements this portion of the flowchart is located at lines 64–68. The operation of lines 64 through 82 will be described assuming circuit breaker 44 of feeder 36 has been open long enough so that all associated timers have timed out. This means that contact FDR 152b MOC on line 5 is closed thereby energizing coil F1CB on line 5 which closes the F1CB contact on line 64. After the 60 second timer on line 64 has timed out, coil F1-79LO-1 is energized thereby opening the F-179LO-1 contacts on lines 65 and 67. In this state the F1-PRX coil on line 67 can not be energized which prevents reclosing. When the circuit breaker 44 is closed the F1CB contact on line 5 opens deenergizing the F1CB coil on line 5. This drops out the F1CB contact on line 64 deenergizing coil F1-79LO-1 on the same line which closes the F1-79L0-1 contacts on lines 65 and 67. When the 90 second timer on line 65 times out, the F1-79LO-2 coil is energized which closes the F1-79LO-2 contact on line 67. The F1-62 coil on line 68 is deenergized at this point so the F1-62 contact on line 67 is closed. When the protective relays associated with feeder 36 detect a fault, the contact on line 13 closes energizing the F1TRIP coil on the same line, which closes the F1TRIP contact on line 67. Since the other contacts on line 67 are closed at this point, the F1-PRX coil is energized, and seals itself in by closing the F1-PRX contact on line 66. The F1-PRX contact on line 68 also closes which starts the 60 second timer for coil F1-62. This is the 60 second reclosing window for which all actions must take place if the circuit breaker is to reclose successfully. Once the F1-62 coil energizes it opens the F1-62 contact on line 67 and deenergizes the F1-PRX coil on line 67, which ends the reclosing cycle.

Figure 4B:
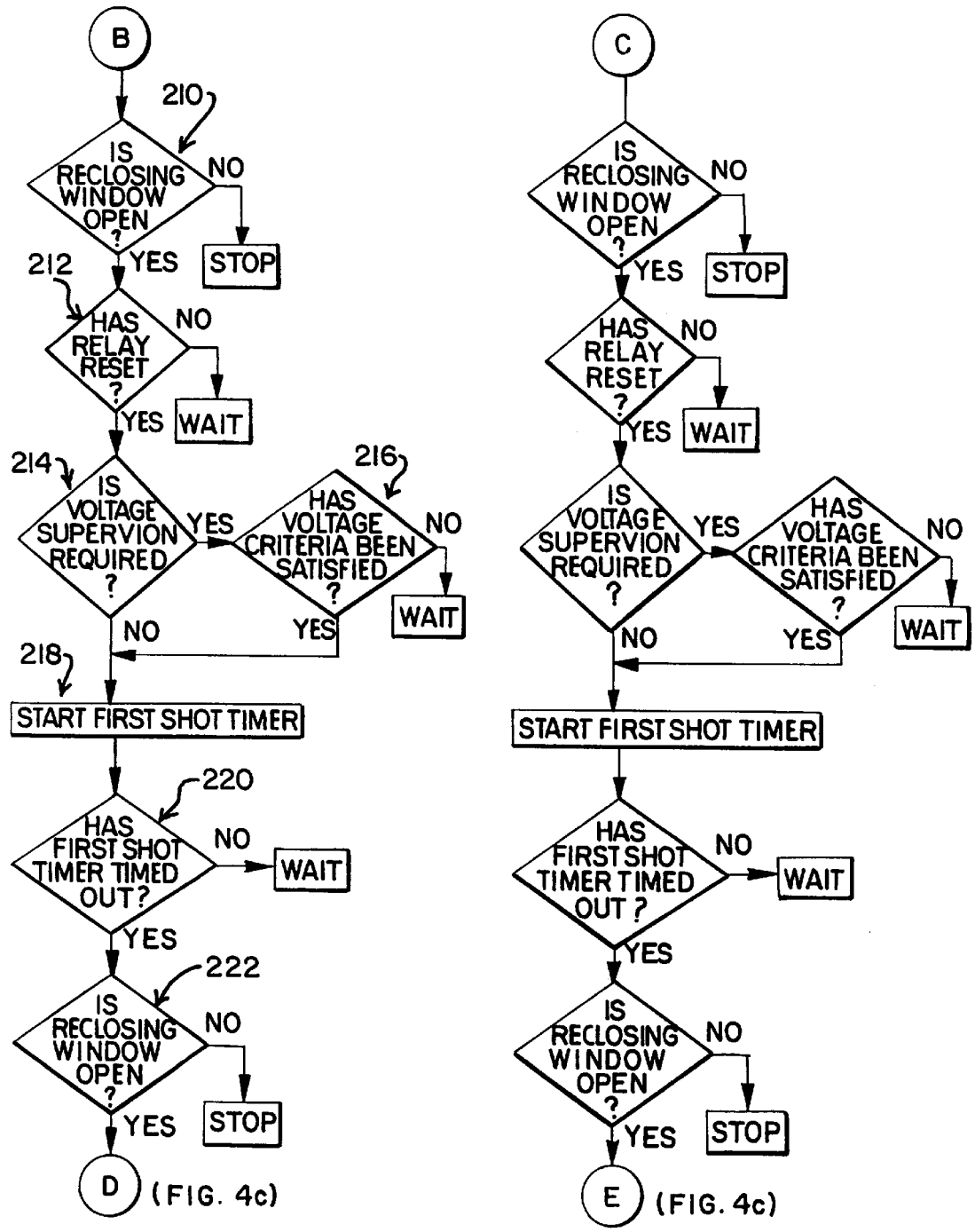
Figure 4C:
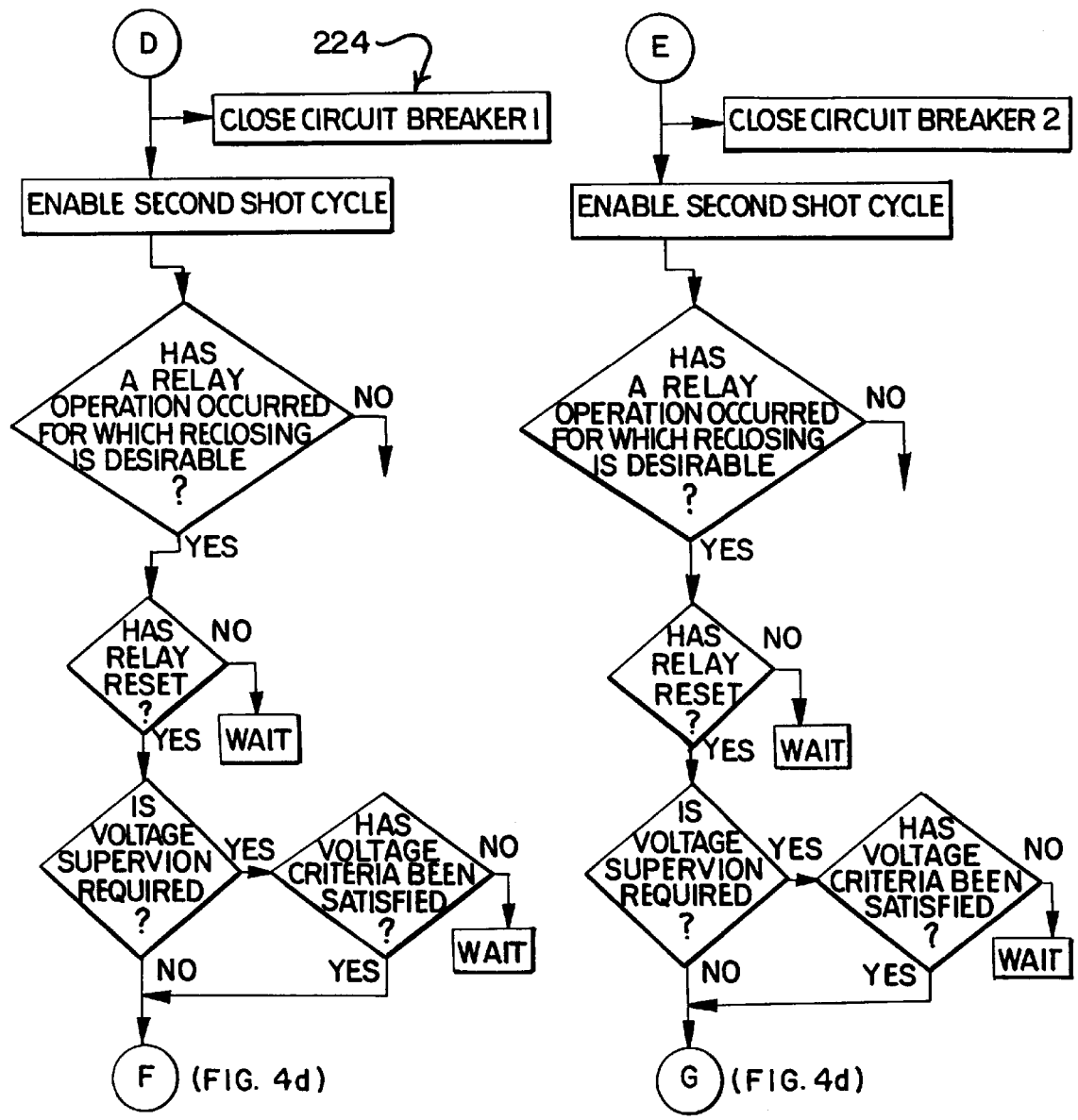
Figure 4D:
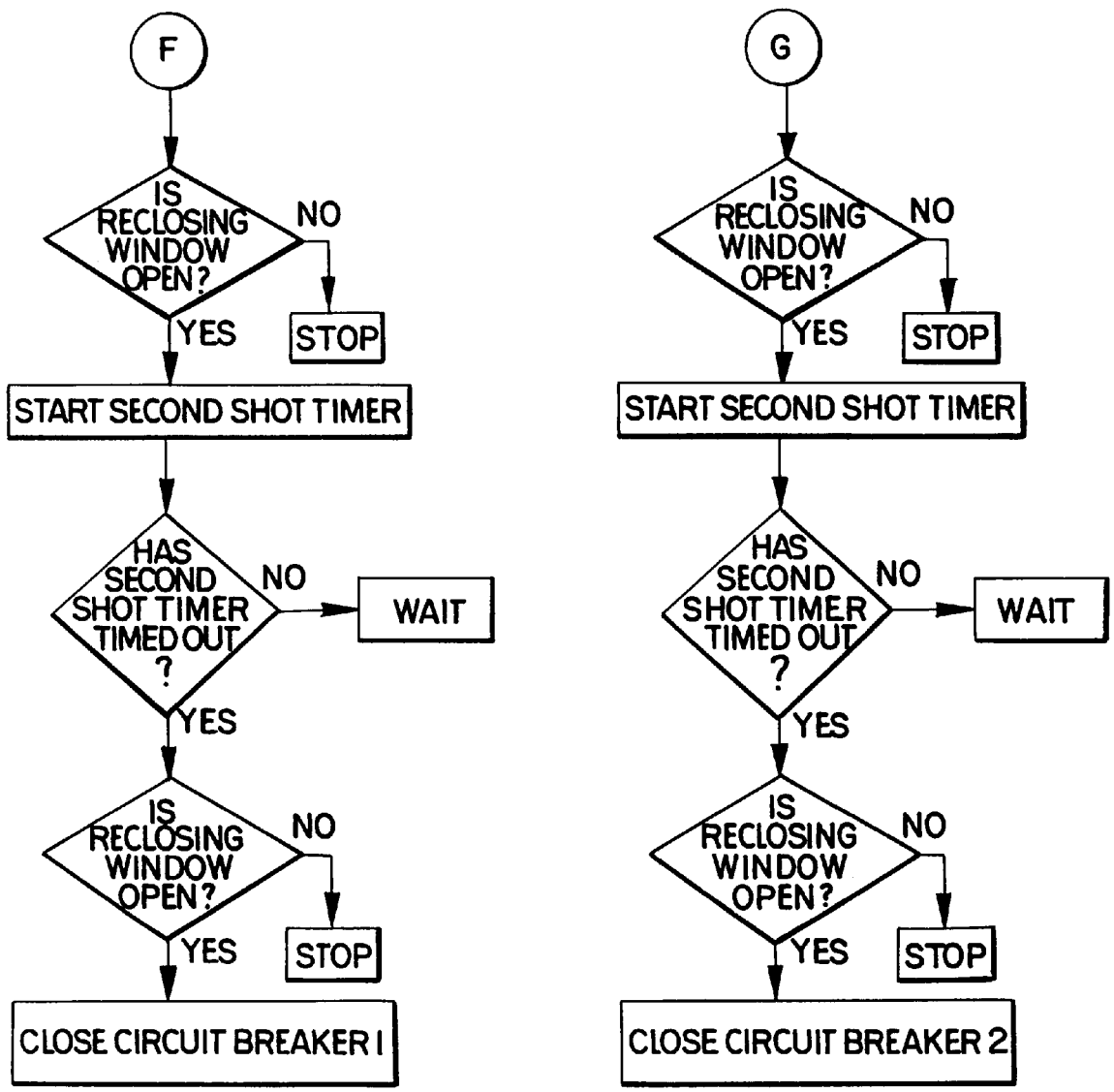
Figure 5C:
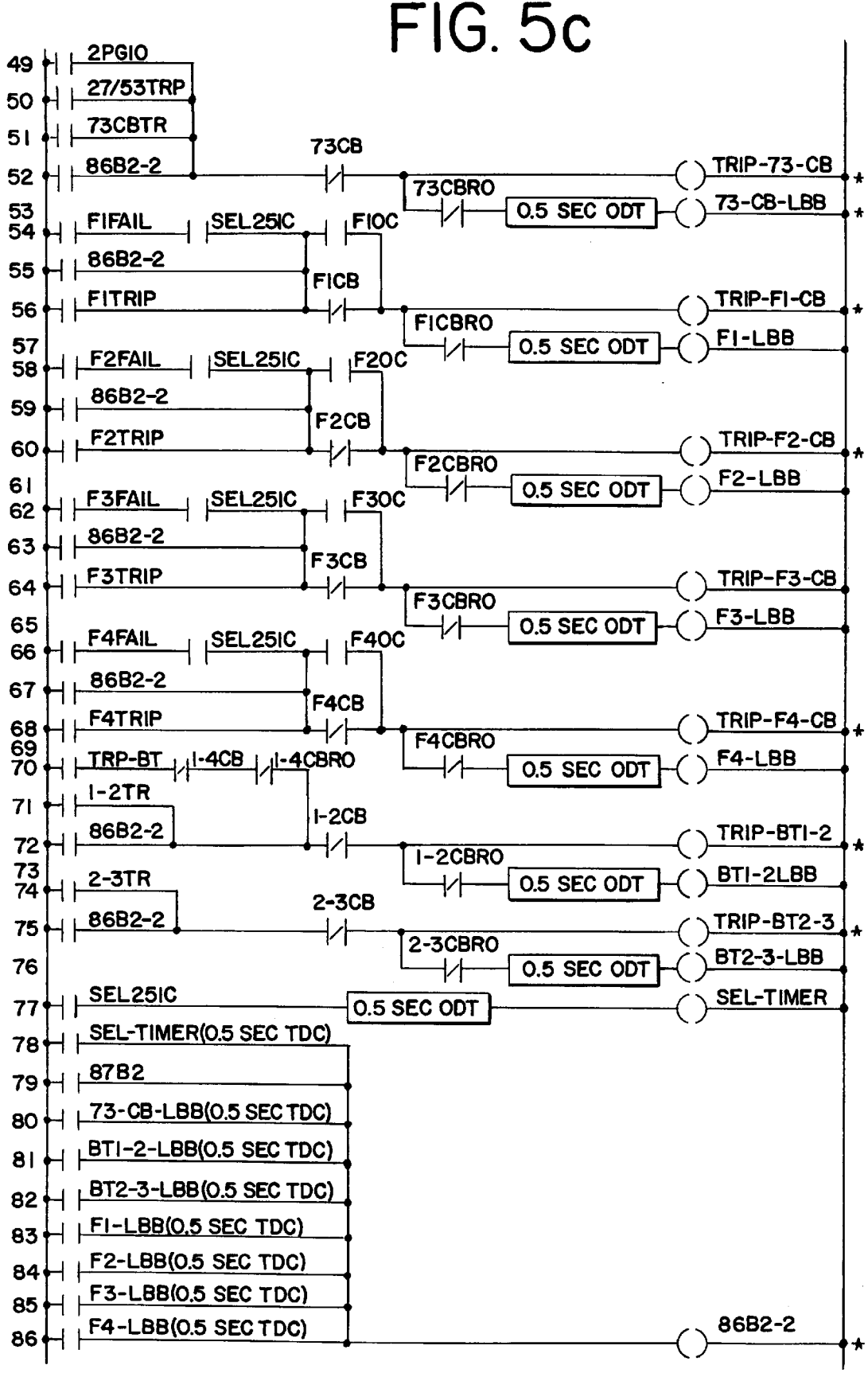
Figure 5D:
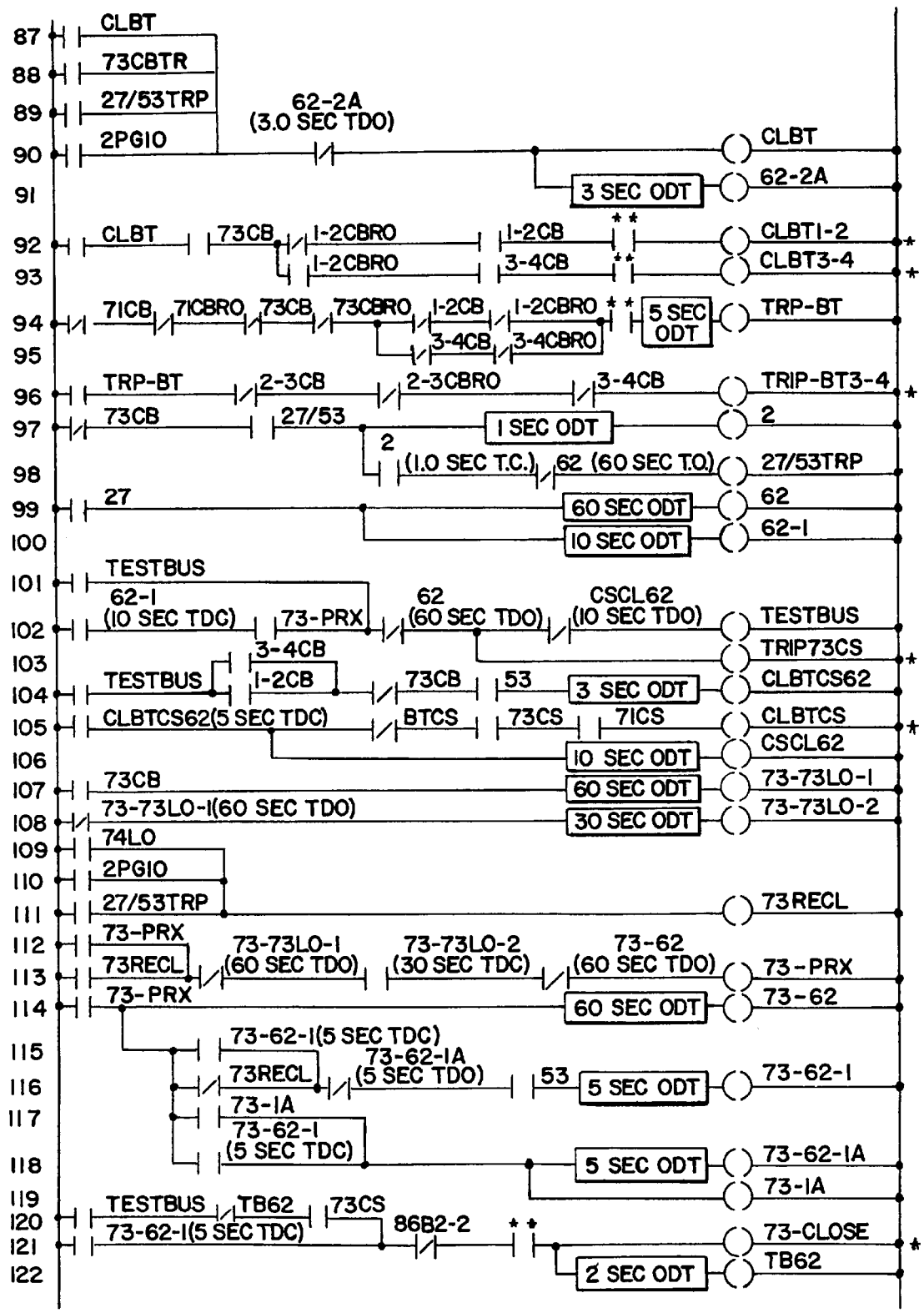
Figure 5E:
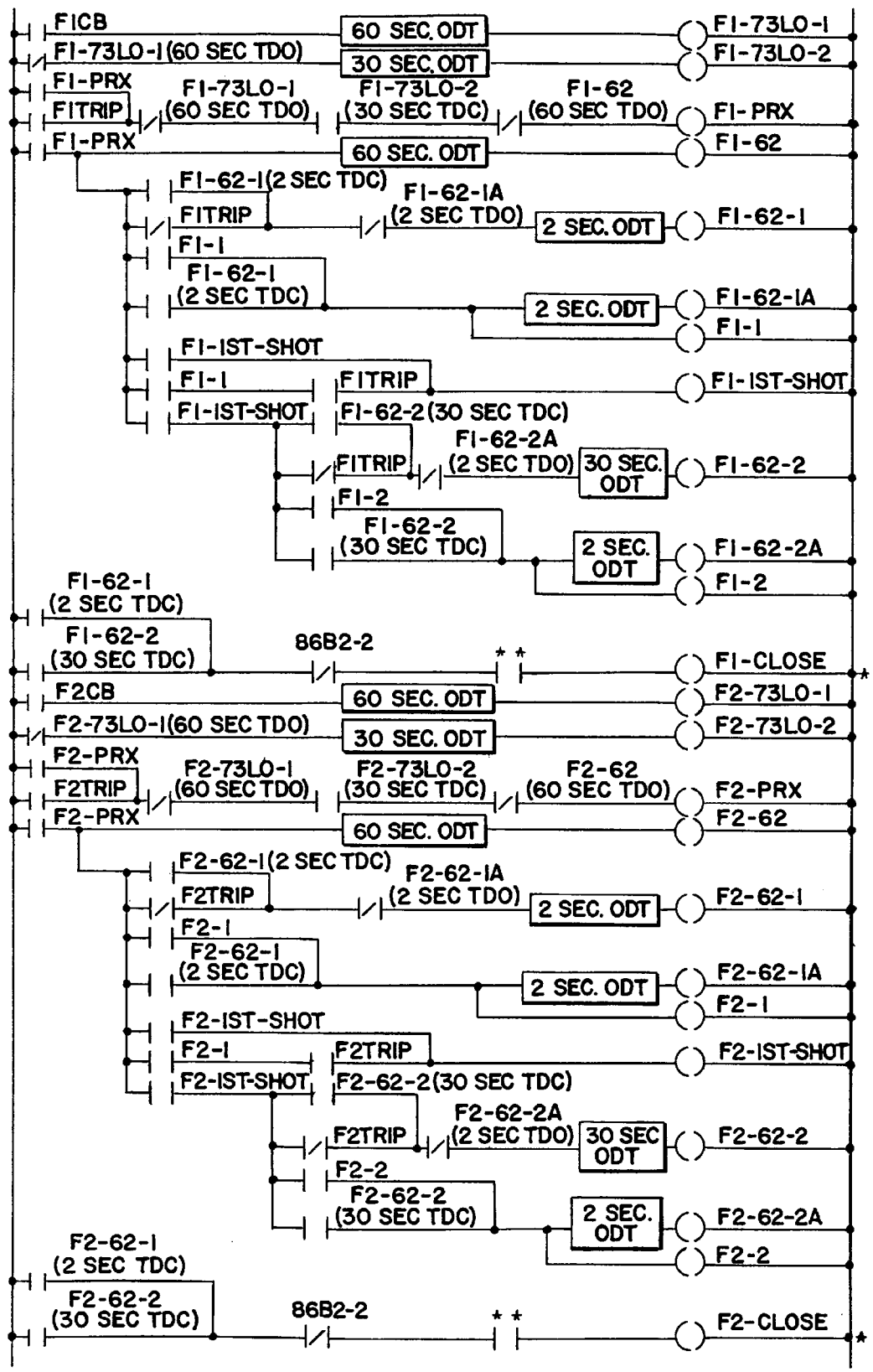
Figure 5F:
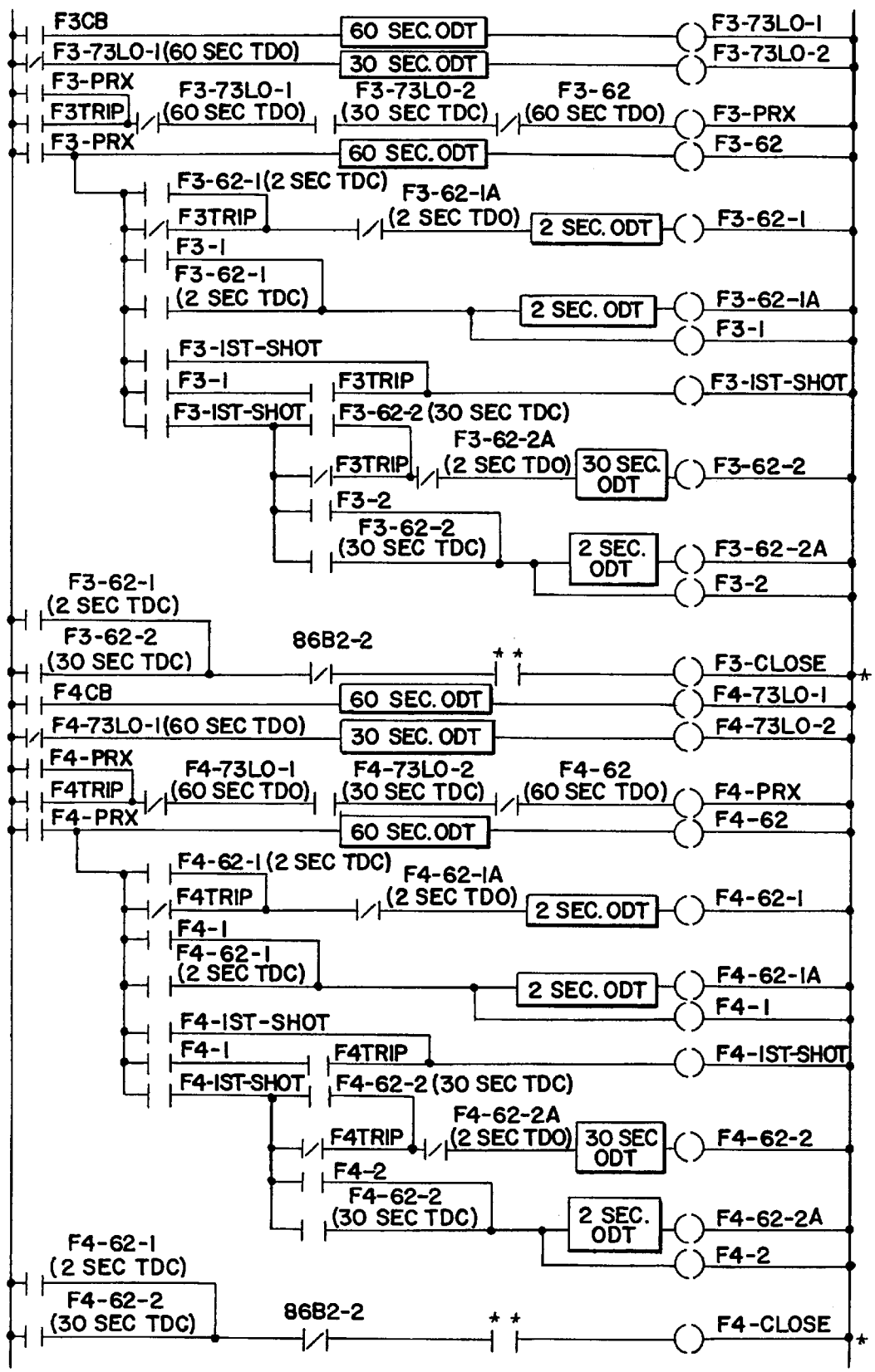
Figure 6B:
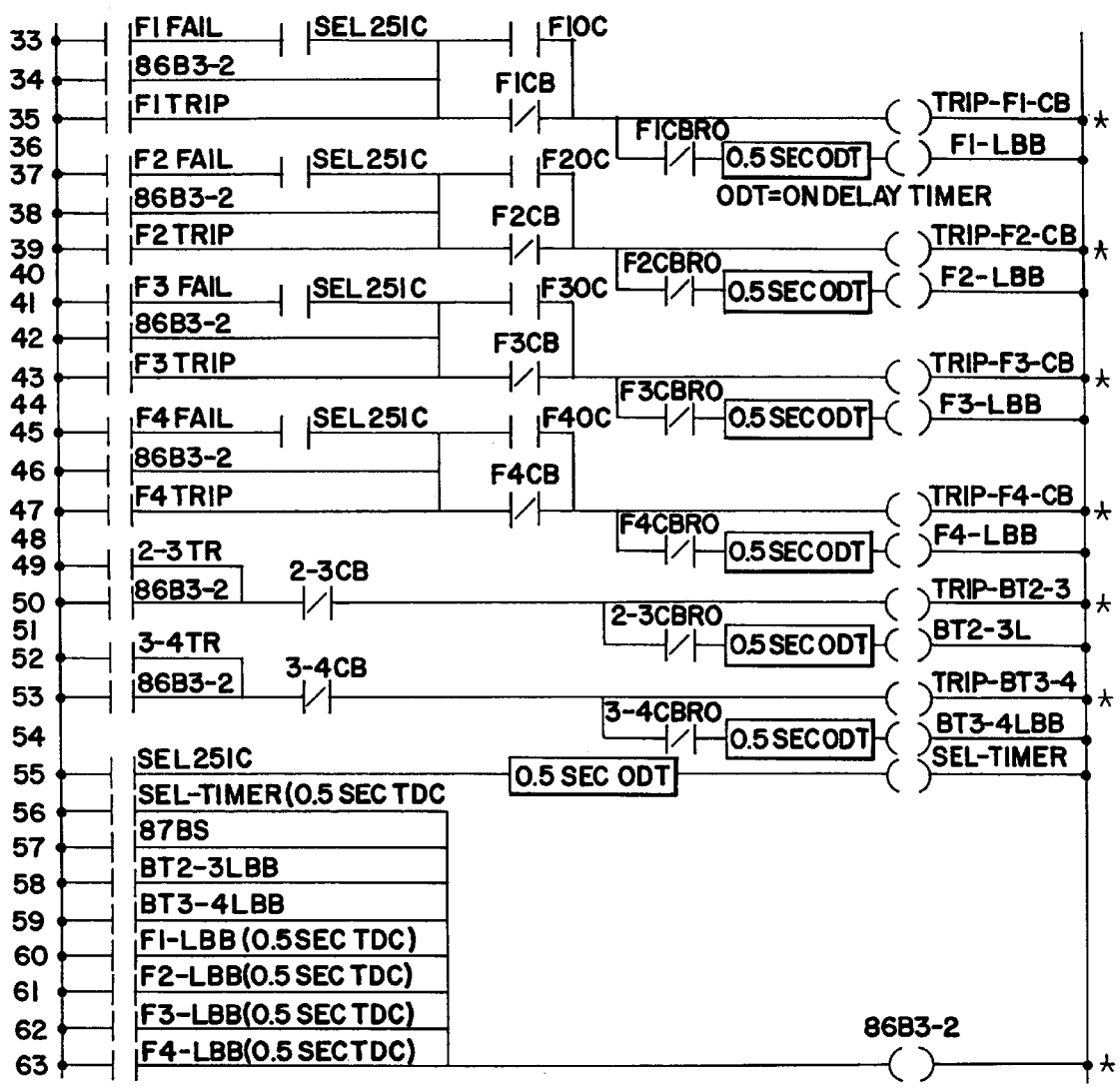
Figure 6C:
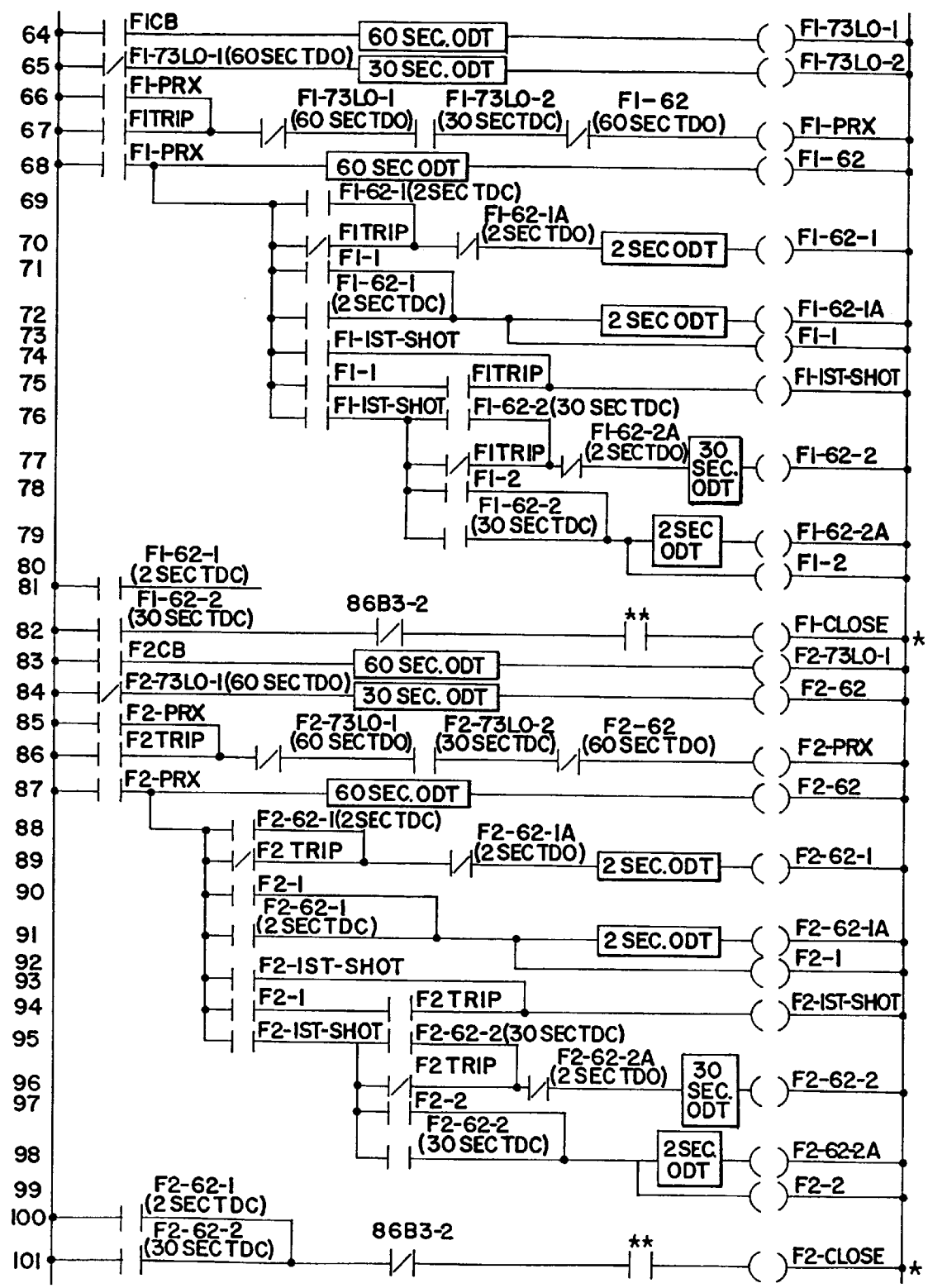
Figure 6D:
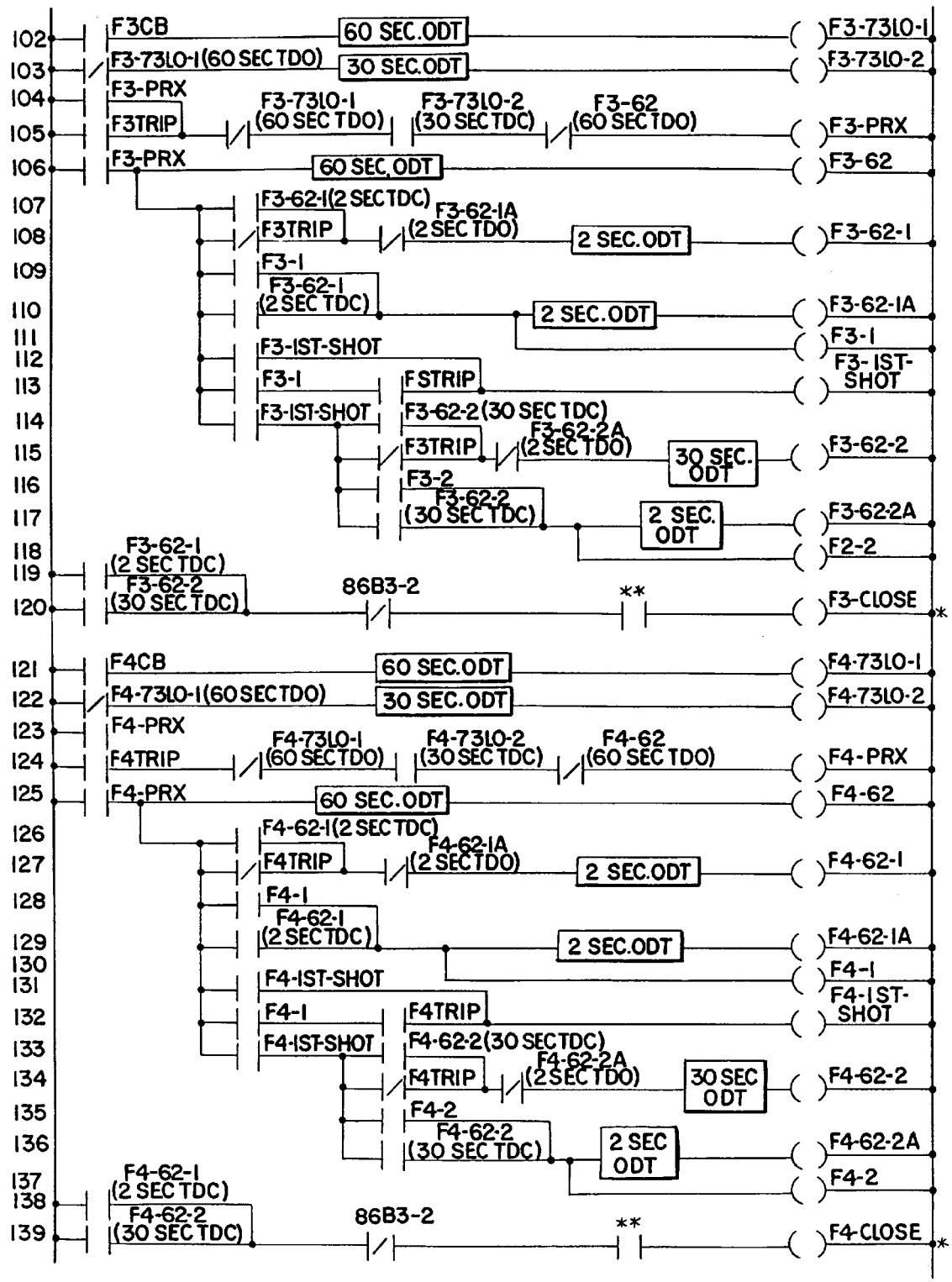

Referring to FIG. 4b it is determined at block 210 if the reclosing window is still open. If it is not, the reclosing operation stops. If it is, control is passed to block 212 where it is determined if the relay associated with the circuit breaker has reset meaning it no longer detects a predetermined condition. If the relay has not reset, the sequence waits until it has. If it has reset, control is passed to block 214 where it is determined whether voltage supervision is required. If it is, control is passed to block 216 which determines whether the voltage criteria has been satisfied. If it has not, the sequence waits until it has. If it has been satisfied, control is passed to block 218 which starts a first shot timer. If it is determined at block 214 that no supervision is required, control is passed directly to block 218. At block 220 it is determined whether the first shot timer has timed out. If it has not, the sequence waits until it has. If it has, control is passed to block 222 which determines if the reclosing window is still open. If it is not, the reclosing sequence is terminated. If it is still open, control is passed to block 224 in FIG. 4c which outputs a command to close circuit breaker 44.

Referring back to FIG. 2c, the ladder logic that implements this portion of the flowchart is located at lines 69–73. When the F1-PRX coil is energized which means the reclosing window is still open and the feeder 36 relay or relays 46 and/or 48 resets, indicating the fault condition has been deenergized, the F1TRIP contact closes on line 70 and starts the 2 second timer since the F1-62-1A contact will be closed at this point. When the timer times out, the F1-62-1 coil on line 70 is energized which closes the F1-62-1 contacts on lines 69, 72, and 81. The F1-62-1 contact on line 81 energizes the output coil F1-CLOSE on line 82 and closes the circuit breaker if the virtual contact  on line 82 is closed and the 86B1-2 contact is closed, which it normally will be unless some other protective relay action has taken place as shown on lines 56–63. The virtual contact is closed to indicate that reclosing is turned on by a System Integrator (not shown), which can be done locally or at a remote location. In particular, a computer can be coupled to PLC 74 to command contact  to be open or closed under user activated conditions. The purpose of lines 69–73 is to keep the F1-62-1 coil energized on for a period of time long enough to close the circuit breaker and then to drop it out and prevent it from being energized again in the 60 second reclosing window. This is accomplished by sealing in the F1-62-1 coil by the F1-62-1 contact on line 69 through the F1-62-1A contact on line 70. The F1-62-1 contact on line 72 closes and energizes coil F1-1 on line 73 and starts another timer, which preferably times out after 2 seconds but is not restricted to that length of time. This timer only needs to be set long enough for the circuit breaker to close. A time of about 0.5 seconds may be adequate. Regardless of the timer setting, the F1-1 coil seals itself in on line 71 which keeps the timer activated which, when it times out, will energize coil F1 62-1A and open the F1-62-1A contact on line 70 dropping out the F1-62-1 coil on line 70, which opens the F1-62-1 contact on line 81 thereby deenergizing coil F1-CLOSE.

The F1-1 coil on line 73 also closes the F1-1 contact on line 75. If another fault occurs during the 60 second reclosing window, the protective relay or relays for feeder 36 will operate again and energize the F1-TRIP coil on line 13 and close the F1TRIP contact on line 75 which energizes the F1-1ST-SHOT coil on line 75. This then seals itself in by closing the F1-1ST-SHOT contact on line 74, and closes the F1-1ST-SHOT contact on line 76. This sets up the logic for the second closing operation.

Referring back to FIGS. 4c and 4d, the second closing operation is the same as the first closing operation already described and thus, need not be described again.

Referring to the ladder logic shown in FIG. 2c, when the protective relay or relays reset, indicating that the fault has been deenergized, the F1-TRIP contact on line 77 closes and starts the 30 second time for coil F1-62-2 through the F1-62-2A contact which at this point is closed. When the timer times out and coil F1-62-2 is energized, the F1-62-2 contacts on lines 76, 79 and 82 close. The contact on line 82 energizes the output coil F1-CLOSE which again closes the circuit breaker if the conditions as previously described still exist.

Lines 76–80 do the same functions for the second reclosing output as lines 69–73 do for the first reclosing output, to keep the close on long enough for the circuit breaker to close. If the circuit breaker trips again, such as when a tree or some object is contacting the feeder, no additional reclosing will take place because the F1-62-1 and F1-62-2 coils can not be energized because the F1-62-1A and F1-62-2A contacts are held open until the F1-PRX contact on line 68 opens. Whether or not the circuit breaker is closed, the 60 second timer for F1-62 will time out opening the F1-62 contact on line 67 which deenergizes the F1-PRX coil. If the circuit breaker is closed another cycle of reclosing can take place at this point. If the circuit breaker is open, indicating it tripped again because of a fault, the F1CB contact on line 64 will be closed which will energize the F1-79LO-1 coil on line 64 after 60 seconds. This will open the F1-79LO-1 contacts on line 65 and 67, which will prevent the F1-PRX coil from being energized to start the reclosing window.

Additional reclosing attempts can be made by repeating lines 74–81 and extending the reclosing window.

FIGS. 5a–5f illustrate the ladder logic to control the second bus 22. FIGS. 6a–6d illustrate the ladder logic to control the third bus 24. FIGS. 7a–7f illustrate the ladder logic to control the fourth bus 26. Because the ladder logic is similar to that already described these figures need not be described.

Figure 7C:
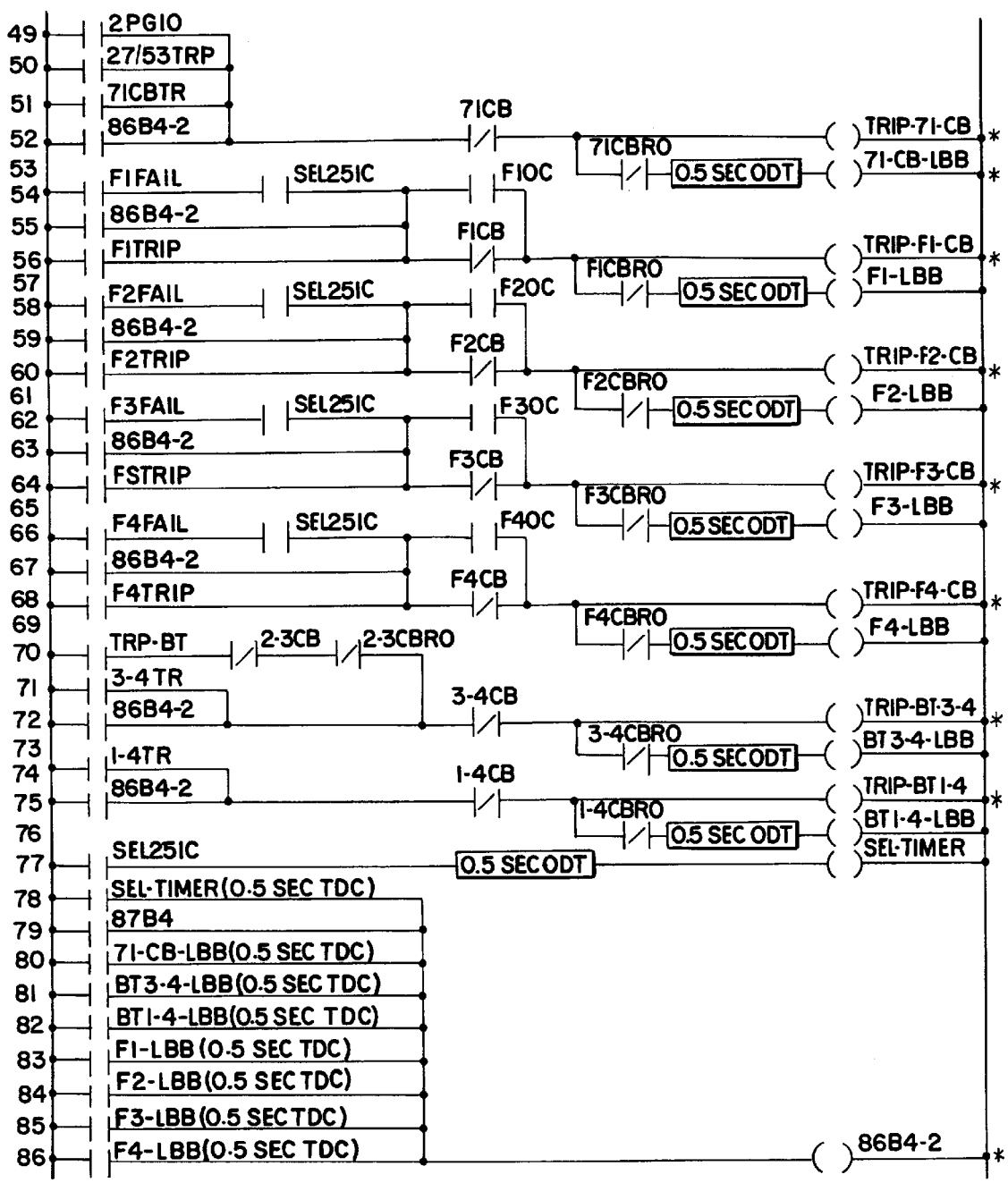
Figure 7D:
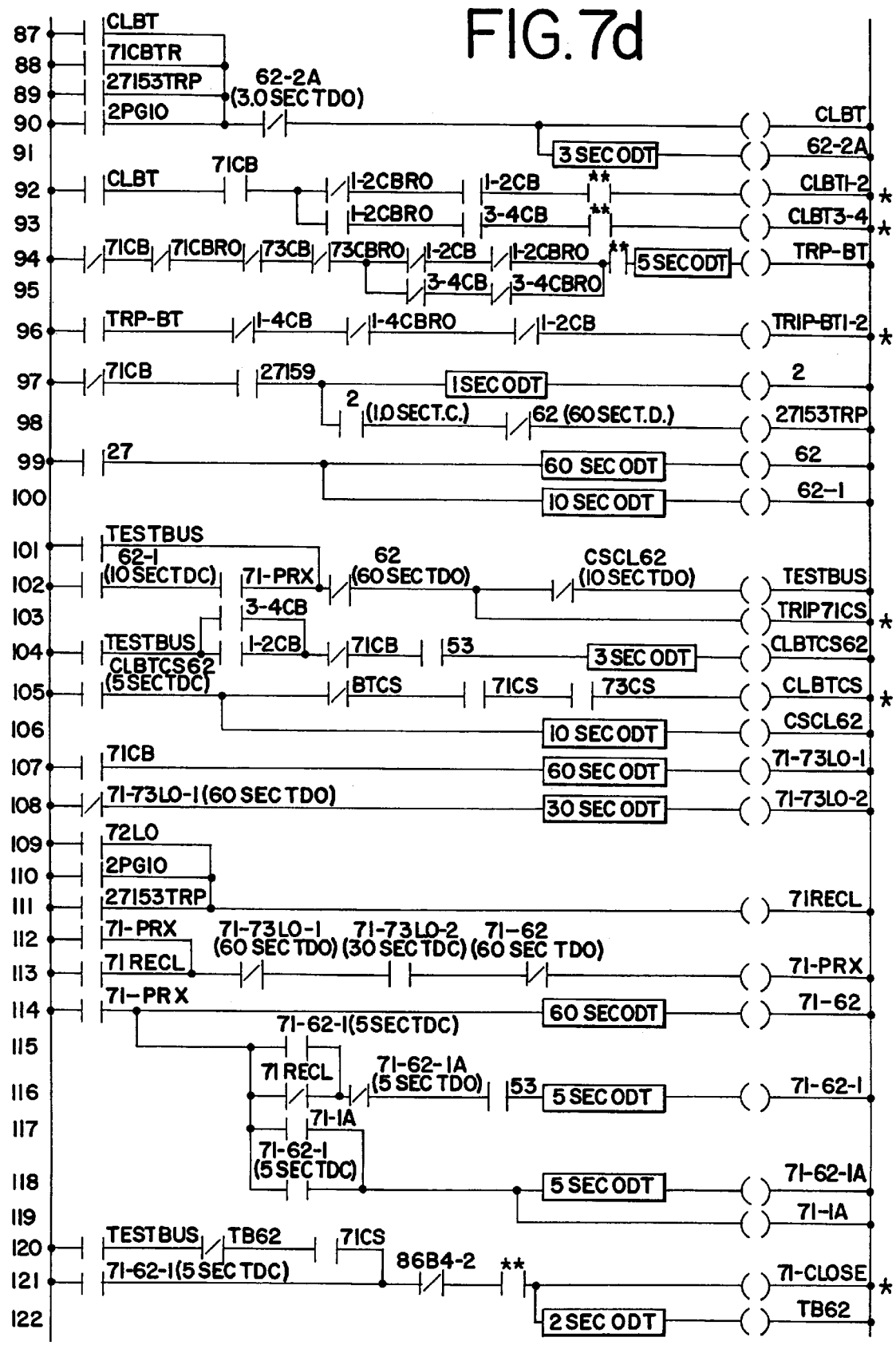
Figure 7E:
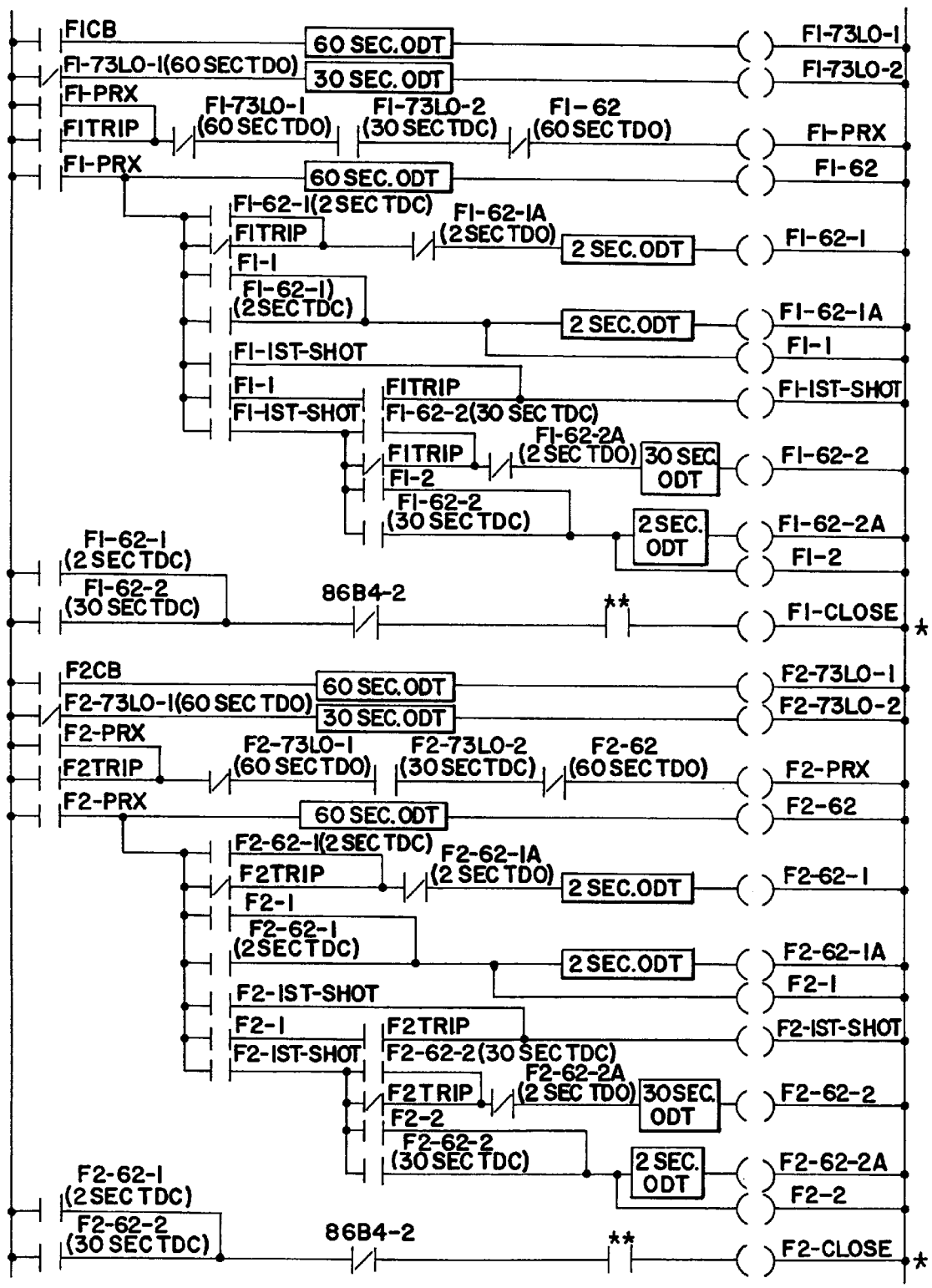
Figure 7F:
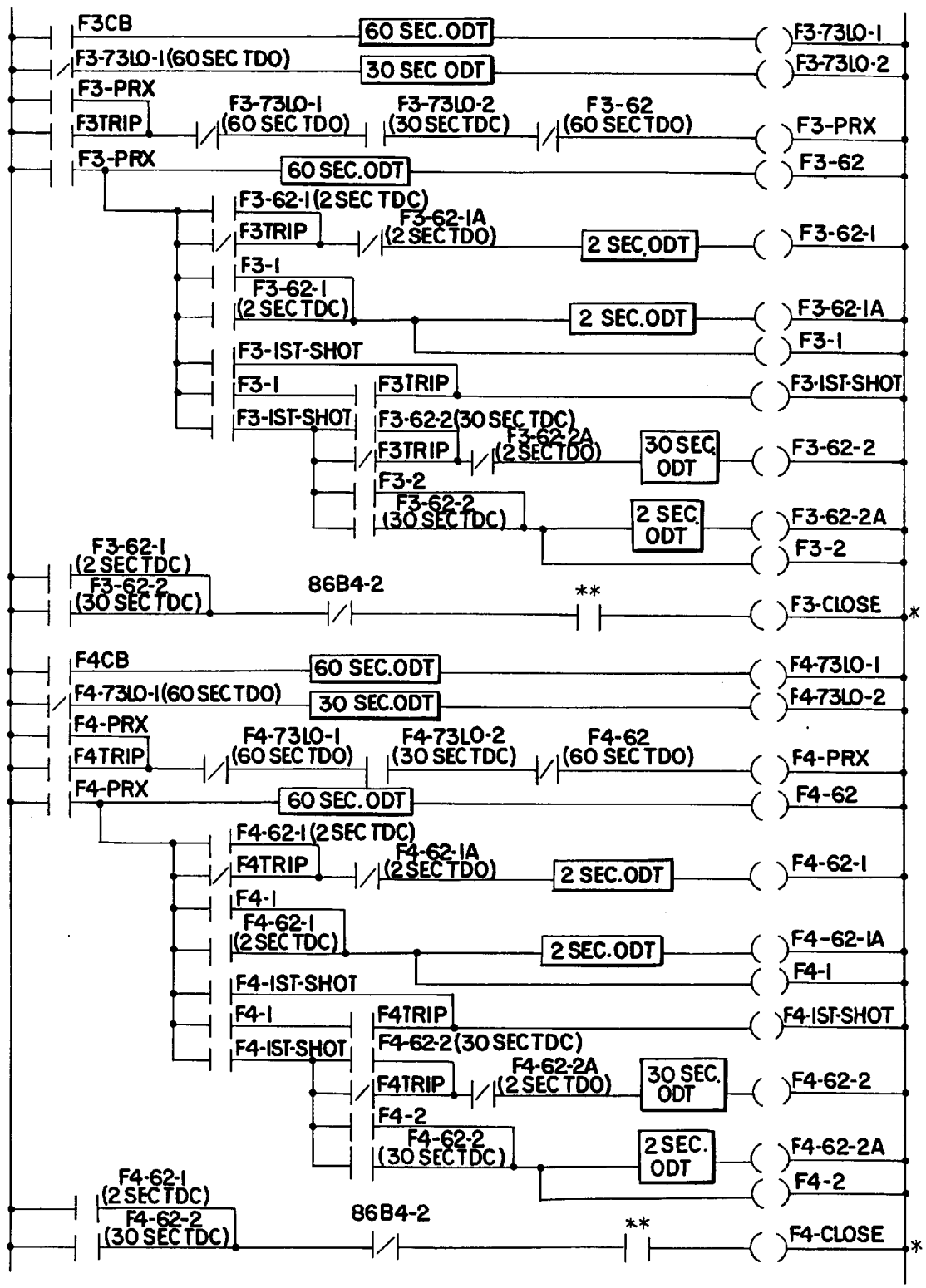

The voltage supervision decision shown in FIG. 4b is not shown in the ladder logic for the first bus 20, however, with reference to the ladder logic for the fourth bus shown in FIG. 7d, it is shown at line 116.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A system for detecting the failure of a circuit breaker in a power substation, the system comprising:
   at least one bus having at least two feeders wherein each feeder has at least one circuit breaker;
   at least one relay associated with each circuit breaker of the at least two feeders wherein the relay is energized upon the detection of a predetermined event; and
   a programmable controller having a plurality of inputs and a plurality of outputs wherein the programmable controller has inputs coupled to each circuit breaker and the relay associated therewith and has outputs coupled to each of the circuit breakers wherein the programmable controller is programmed to detect the energization of a relay and output a signal to the circuit breaker associated with that relay to cause the circuit breaker to trip and also initiate a timer wherein if the circuit breaker does not trip within an allotted time period a signal is output to all of the circuit breakers on the bus to trip.

2. A system according to claim 1 wherein said programmable controller is a programmable logic controller.

3. A system according to claim 1 wherein the at least one relay is a programmable relay.

4. A system for detecting the failure of a circuit breaker in a power substation, the system comprising:
   at least one bus having at least two feeders wherein each feeder has at least one circuit breaker;
   means coupled to the at least one bus for outputting a signal to a circuit breaker to trip and also initiate a timer wherein if the circuit breaker does not trip within an allotted time period a signal is output to all of the circuit breakers on the at least one bus to trip.

5. A system according to claim 4 wherein said means for outputting is a programmable controller.

6. A system according to claim 4 wherein said programmable controller is a programmable logic controller.

7. A method of detecting the failure of a circuit breaker in a power substation, the method comprising the steps of:
   providing at least one bus having at least two feeders wherein each feeder has at least one circuit breaker;
   providing a programmable controller, the programmable controller carrying out the following steps:

outputting a first signal to trip one of the circuit breakers;

initiating a timer at the time the first signal is output to trip one of the circuit breakers wherein the timer has a predetermined time period;

detecting whether the circuit breaker has tripped and if it has not; and outputting a second signal to trip all the circuit breakers on the at least one bus.

8. A system for detecting the failure of a circuit breaker in a power substation, the system comprising:

at least one bus having at least two feeders wherein each feeder has at least one circuit breaker; and a programmable controller having a plurality of inputs and a plurality of outputs wherein the programmable controller has inputs coupled to each circuit breaker of the at least two feeders and outputs coupled to each circuit breaker of the at least two feeders wherein the programmable controller is programmed to trip a circuit breaker of one of the at least two feeders upon the detection of a predetermined event and also initiate a timer upon the detection of the predetermined event wherein if the programmable controller detects that the circuit breaker has tripped, the timer is disabled but if the programmable controller has not detected a trip in the circuit breaker and the timer has timed out, the programmable controller outputs a signal to all of the circuit breakers on the bus.

9. A system according to claim 8 wherein the programmable controller is a programmable logic controller.

10. A system for detecting the failure of a circuit breaker in a power substation, the system comprising:

at least one bus having at least two feeders, wherein each feeder has at least one circuit breaker, and wherein the at least one bus is in communication with at least two power sources;

at least one relay associated with each circuit breaker of the at least two feeders wherein the relay is energized upon the detection of a predetermined event; and a programmable controller having a plurality of inputs and a plurality of outputs wherein the programmable controller has inputs coupled to each circuit breaker and the relay associated therewith and has outputs coupled to each of the circuit breakers wherein the programmable controller is programmed to detect the energization of a relay and output a signal to the circuit breaker associated with that relay to cause the circuit breaker to trip and also initiate a timer wherein if the circuit breaker does not trip within an allotted time period a signal is output to all of the circuit breakers on the bus to trip, wherein all of the at least two power sources are isolated from the circuit breaker.

11. A system according to claim 10, wherein the at least one bus comprises a first bus electrically connected to a second bus via a bus tie circuit breaker, and wherein a first programmable controller and a second programmable controller are programmed to detect the energization of a relay associated with the bus tie circuit breaker and output a signal to the bus tie circuit breaker to cause the bus tie circuit breaker to trip and also initiate a timer, wherein if the bus tie circuit breaker does not trip within an allotted time period a signal is output to all of the circuit breakers on the first bus and the second bus to trip, wherein all of the at least two power sources are isolated from the bus tie circuit breaker.

12. A method of detecting the failure of a circuit breaker in a power substation in communication with at least two sources of power, the method comprising the steps of:

providing at least one bus in communication with the at least two sources of power, the bus having at least two feeders wherein each feeder has at least one circuit breaker;

providing a programmable controller, the programmable controller carrying out the following steps:

outputting a first signal to trip one of the circuit breakers;

initiating a timer at the time the first signal is output to trip one of the circuit breakers wherein the timer has a predetermined time period; and electrically isolating the circuit breaker from the at least two sources of power if the circuit breaker does not trip within the predetermined time period.

13. A method according to claim 12, wherein the at least one bus further comprises a first bus electrically connected to a second bus via a bus tie circuit breaker, and wherein a first programmable controller and a second programmable controller carry out the following steps:

outputting a first signal to trip the bus tie circuit breaker;

initiating a timer at the time the first signal is output to trip the bus tie circuit breaker wherein the timer has a predetermined time period; and sending a signal to trip all circuit breakers on each of the first and second buses if the bus tie circuit breaker does not trip within the predetermined time period.

* * * * *